United States Patent
Takao et al.

(10) Patent No.: US 10,294,330 B2
(45) Date of Patent: May 21, 2019

(54) POLYPHENYLENE SULFIDE RESIN COMPOSITION AND METHOD OF MANUFACTURING SAME

(71) Applicant: Toray Industries, Inc., Tokyo (JP)

(72) Inventors: Hidenobu Takao, Nagoya (JP); Shu Kaiho, Nagoya (JP); Shunsuke Horiuchi, Nagoya (JP)

(73) Assignee: Toray Industries, Inc. (JP)

( * ) Notice: Subject to any disclaimer, the term of this patent is extended or adjusted under 35 U.S.C. 154(b) by 0 days.

(21) Appl. No.: 15/748,584

(22) PCT Filed: Jul. 22, 2016

(86) PCT No.: PCT/JP2016/071564
§ 371 (c)(1),
(2) Date: Jan. 29, 2018

(87) PCT Pub. No.: WO2017/022524
PCT Pub. Date: Feb. 9, 2017

(65) Prior Publication Data
US 2018/0223046 A1   Aug. 9, 2018

(30) Foreign Application Priority Data

Jul. 31, 2015 (JP) .................................. 2015-151959
Mar. 30, 2016 (JP) .................................. 2016-067765

(51) Int. Cl.
*C08K 3/08* (2006.01)
*C08L 81/02* (2006.01)
*C08G 75/0209* (2016.01)

(52) U.S. Cl.
CPC ............. *C08G 75/0209* (2013.01); *C08K 3/08* (2013.01); *C08L 81/02* (2013.01); *C08K 2003/0818* (2013.01)

(58) Field of Classification Search
CPC ................ C08G 75/14; C08G 75/0259; C08G 75/0281; C08F 6/28
See application file for complete search history.

(56) References Cited

U.S. PATENT DOCUMENTS

| | | | |
|---|---|---|---|
| 5,266,680 A | 11/1993 | Reed | |
| 2007/0093642 A1 | 4/2007 | Sato et al. | |
| 2009/0234068 A1* | 9/2009 | Horiuchi | C08G 75/0227 524/609 |
| 2014/0256907 A1 | 9/2014 | Odashima et al. | |

(Continued)

FOREIGN PATENT DOCUMENTS

| | | |
|---|---|---|
| JP | 64-124 A | 1/1989 |
| JP | 3-74433 A | 3/1991 |
| JP | 2003-113242 A | 4/2003 |

(Continued)

*Primary Examiner* — Shane Fang
(74) *Attorney, Agent, or Firm* — DLA Piper LLP (US)

(57) ABSTRACT

A polyphenylene sulfide resin composition includes a polyphenylene sulfide resin (a) of 90 to 50% by weight and a polyphenylene sulfide resin (b) and/or a polyphenylene sulfide resin (c) of the total of 10 to 50% by weight blended with the polyphenylene sulfide resin (a), relative to the total of the polyphenylene sulfide resins (a) to (c) as 100% by weight, in which the polyphenylene sulfide resin composition has a change rate of viscosity of 1.5 times or less when the composition is heated at 320° C. for 5 hours.

12 Claims, 11 Drawing Sheets

(56) References Cited

U.S. PATENT DOCUMENTS

2014/0343215 A1* 11/2014 Ouchiyama ............ C08L 81/02
                    524/500
2015/0126668 A1  5/2015 Kanomata et al.

FOREIGN PATENT DOCUMENTS

| | | |
|---|---|---|
| JP | 2005-225931 A | 8/2005 |
| JP | 2011-173953 A | 9/2011 |
| WO | 2007/034800 A1 | 3/2007 |
| WO | 2013/061561 A1 | 5/2013 |
| WO | 2013/099234 A1 | 7/2013 |
| WO | 2013/161321 A1 | 10/2013 |

* cited by examiner

POLYPHENYLENE SULFIDE RESIN COMPOSITION AND METHOD OF MANUFACTURING SAME

TECHNICAL FIELD

This disclosure relates to a polyphenylene sulfide resin composition having excellent melt stability and generating a smaller amount of gas, and to a manufacturing process therefor.

BACKGROUND

Polyphenylene sulfide (hereinafter may be abbreviated as "PPS") has a high melting point and favorable properties as engineering plastics, for example, excellent flame resistance, chemical resistance and the like. Because PPS can be formed into various moldings, films, sheets, fibers and the like by a common melt processing method such as extrusion molding, injection molding, or compression molding, PPS is generally used in a wide range of fields covering electrical and electronic equipment, automotive equipment and the like. However, PPS is problematic in that it generally has low melt stability, and particularly problematic in that the quality of the obtained moldings is not constant in the production of films, fibers and the like in which the melt residence time is long.

A current mainstream production process of PPS is a solution polymerization process in which an alkali metal sulfide such as sodium sulfide is allowed to react with a dihalogenated aromatic compound such as p-dichlorobenzene in an organic amide solvent such as N-methyl-2-pyrrolidone, but PPS produced by this process is problematic in that it generates a large amount of gas when heated because such PPS contains a large amount of low molecular weight components. Those gas components can cause deposits on metal molds and spinnerets during melt processing, and then it is desired to reduce the gas from the viewpoint of enhancing quality and productivity.

In response to the problem posed in that the quality of the obtained moldings is not constant, a process in which the pH of a washing fluid is adjusted when PPS obtained by a solution polymerization process is washed is proposed as a production process of PPS whose viscosity change is reduced during melt residence (JP 2005-225931 A).

In response to the problem posed in that the PPS generates a larger amount of gas when heated, a PPS obtained by heating a prepolymer containing a cyclic PPS is proposed as a PPS that generates a reduced amount of gas when heated (WO 2007/034800).

As known technologies related to WO 2007/034800, a process in which a polymerization rate is enhanced by allowing a metal carboxylate salt to coexist during the heating of a prepolymer (JP 2011-173953 A) and a process in which a PPS having a reactive terminal incorporated therein is obtained by allowing a sulfide compound having a functional group such as an amino group to coexist (WO 2013/161321) are known.

Further, a process in which a PPS having excellent heat resistance and low gas generation is obtained by blending the PPS obtained by a solution polymerization process and the PPS obtained by WO 2007/034800 (WO 2013/099234) and a process in which a PPS containing a reactive terminal group and having excellent low gas generation is obtained by blending the PPS obtained by WO 2007/034800 and the PPS obtained by WO 2013/161321 are proposed.

When PPS is obtained by a process described in JP 2005-225931 A, it has a small viscosity change during melt residence, but the effect is not sufficient, and in addition, there is a problem in that the process causes a large amount of gas to be generated by heating because it uses a PPS obtained by a solution polymerization process. On the contrary, when PPS is obtained by a process described in WO 2007/034800, it generates a smaller amount of gas when heated, but such a PPS is problematic in that it has a larger viscosity change during melt residence.

The PPSs obtained by JP 2011-173953 A and WO 2013/161321 are also unsatisfactory in terms of melt stability, and it is inferred that the reason for it is that the PPSs obtained by these processes have active terminals derived from additives and tend to cause postpolymerization and crosslinking reaction.

The PPSs obtained by processes of WO 2013/099234 and WO 2013/161321 are also unsatisfactory in terms of melt stability, and the PPSs obtained in Examples described in WO 2013/099234 and WO 2013/161321 do not allow their sufficient enhancement in melt stability to be confirmed.

It could therefore be helpful to provide a PPS having a smaller viscosity change during a long-time melt residence and generating a smaller amount of gas when heated.

SUMMARY

We thus provide:

(I) A polyphenylene sulfide resin composition contains 90 to 50% by weight of a polyphenylene sulfide resin (a) and the total of 10 to 50% by weight of a polyphenylene sulfide resin (b) and/or a polyphenylene sulfide resin (c) blended with the polyphenylene sulfide resin (a), relative to the total of the polyphenylene sulfide resins (a) to (c) as 100% by weight, wherein the polyphenylene sulfide resin composition has a change rate of viscosity of 1.5 times or less when the composition is heated at 320° C. for 5 hours.

Polyphenylene sulfide resin (a): a polyphenylene sulfide resin having a weight average molecular weight of 50,000 or more and having a weight reduction ratio $\Delta Wr$ of 0.18% or less when the resin is heated, in which the ratio is represented by Equation (1);

polyphenylene sulfide resin (b): a polyphenylene sulfide resin having a weight average molecular weight of less than 50,000 and an alkaline earth metal content of less than 200 ppm, and having an increase rate of molecular weight of 5.0% or less when the resin is heated at 320° C. for 10 minutes together with 0.5% by weight of 2-(3,4-epoxycyclohexyl)ethyltrimethoxysilane added thereto; and polyphenylene sulfide resin (c): a polyphenylene sulfide resin containing 200 to 800 ppm of an alkaline earth metal (d) and having a weight reduction ratio $\Delta Wr$ of more than 0.18% when the resin is heated, in which the ratio is represented by Equation (1):

$$\Delta Wr = (W1 - W2)/W1 \times 100 (\%) \quad (1)$$

(wherein $\Delta Wr$ is a weight reduction ratio (%), which is a value determined from a sample weight (W1) at 100° C. reached and a sample weight (W2) at 330° C. reached in thermogravimetric analysis carried out under a non-oxidizing atmosphere at normal pressure at a temperature raising rate of 20° C./minute);

or
(II) a polyphenylene sulfide resin composition that, in a molecular weight distribution measured in size exclusion chromatography,
  (i) has a peak top of a main peak in a molecular weight region of 10,000 to 1,000,000, and
  (ii) has a peak top of a subpeak in a molecular weight region of 100 to less than 10,000,
  (iii) in which the area fraction of the subpeak is 1.0 to 20%; and that has a change rate of viscosity of 1.5 times or less when the composition is heated at 320° C. for 5 hours.

A process of producing a polyphenylene sulfide resin composition, the process including blending a polyphenylene sulfide resin (a) in an amount of 90 to 50% by weight with a polyphenylene sulfide resin (b) and/or a polyphenylene sulfide resin (c) in a total amount of 10 to 50% by weight, relative to the total of the polyphenylene sulfide resins (a) to (c) as 100% by weight, wherein the resulting polyphenylene sulfide resin composition has a change rate of viscosity of 1.5 times or less when the composition is heated at 320° C. for 5 hours:

polyphenylene sulfide resin (a): a polyphenylene sulfide resin having a weight average molecular weight of 50,000 or more and having a weight reduction ratio $\Delta Wr$ of 0.18% or less when the resin is heated, in which the ratio is represented by Equation (1);

polyphenylene sulfide resin (b): a polyphenylene sulfide resin having a weight average molecular weight of less than 50,000 and an alkaline earth metal content of less than 200 ppm, and having an increase rate of molecular weight of 5.0% or less when the resin is heated at 320° C. for 10 minutes together with 0.5% by weight of 2-(3,4-epoxycyclohexyl)ethyltrimethoxysilane added thereto; and polyphenylene sulfide resin (c): a polyphenylene sulfide resin containing 200 to 800 ppm of an alkaline earth metal (d) and having a weight reduction ratio $\Delta Wr$ of more than 0.18% when the resin is heated, in which the ratio is represented by Equation (1):

$$\Delta Wr = (W1 - W2)/W1 \times 100(\%) \quad (1)$$

(wherein $\Delta Wr$ is a weight reduction ratio (%), which is a value determined from a sample weight (W1) at 100° C. reached and a sample weight (W2) at 330° C. reached in thermogravimetric analysis carried out under a non-oxidizing atmosphere at normal pressure at a temperature raising rate of 20° C./minute).

The aforementioned aspect (I) of the polyphenylene sulfide resin compositions has a polydispersity index that is preferably 2.5 or less as obtained by dividing a weight average molecular weight of the polyphenylene sulfide resin (a) by a number average molecular weight thereof.

In the aforementioned aspect (I) of the polyphenylene sulfide resin compositions, the polyphenylene sulfide resin (a) preferably has an alkali metal content of 700 ppm by weight or less.

In the aforementioned aspect (I) of the polyphenylene sulfide resin compositions, a lactone-type compound content in a gas component generated by heating the polyphenylene sulfide resin (a) is preferably 500 ppm by weight or less relative to the weight of the polyphenylene sulfide resin.

In the aforementioned aspect (I) of the polyphenylene sulfide resin compositions, an aniline-type compound content in a gas component generated by heating the polyphenylene sulfide resin (a) is preferably 300 ppm by weight or less relative to the weight of the polyphenylene sulfide resin.

In the aforementioned aspect (I) of the polyphenylene sulfide resin compositions, the polyphenylene sulfide resin (a) is preferably a polyphenylene sulfide resin that is obtained by heating a polyphenylene sulfide prepolymer containing a 85% by weight or more of a cyclic polyphenylene sulfide represented by General Formula (A) and having a weight average molecular weight of less than 10,000 and by converting the prepolymer to a high polymerization degree product having a weight average molecular weight of 50,000 or more.

(A)

(wherein m is an integer of 4 to 20; and the cyclic polyphenylene sulfide may be a mixture of compounds represented by the General Formula (A) which have different m values from 4 to 20.)

In the aforementioned aspect (I) of the polyphenylene sulfide resin compositions, a lactone-type compound content in a gas component generated by heating the polyphenylene sulfide resin (b) is preferably 500 ppm by weight or less relative to the weight of the polyphenylene sulfide resin.

In the aforementioned aspect (I) of the polyphenylene sulfide resin compositions, the alkaline earth metal (d) is preferably calcium.

In the aforementioned aspect (II) of the polyphenylene sulfide resin compositions, a content of the alkaline earth metal is preferably 20 to 1,000 ppm by weight.

In the aforementioned aspect (II) of the polyphenylene sulfide resin compositions, a weight reduction ratio $\Delta Wr$ caused when the composition is heated is preferably 0.30% or less, in which the weight reduction ratio is represented by Equation (1).

We can provide a PPS resin composition having high melt flowability and excellent processability in addition to the characteristics of the smaller viscosity change during melt residence and the smaller amount of gas generated by heating, which are preferred for applications in which a melt residence time until molding is long, for example, the production of fibers, films, and the like.

DETAILED DESCRIPTION

Figure 1:
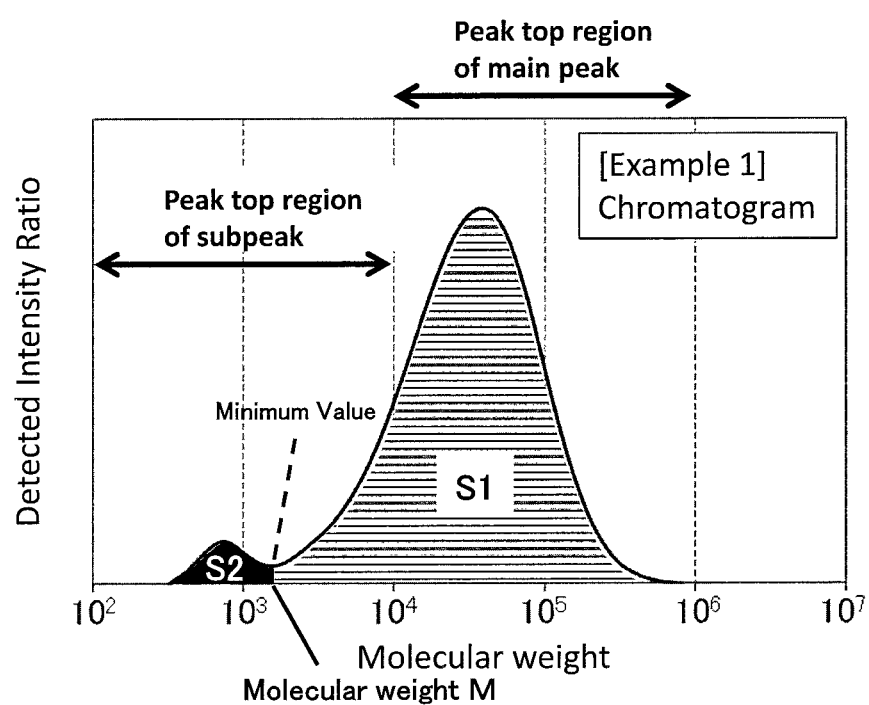
FIG. 1 is a GPC chart of the PPS resin composition obtained in Example 1.
Figure 2:
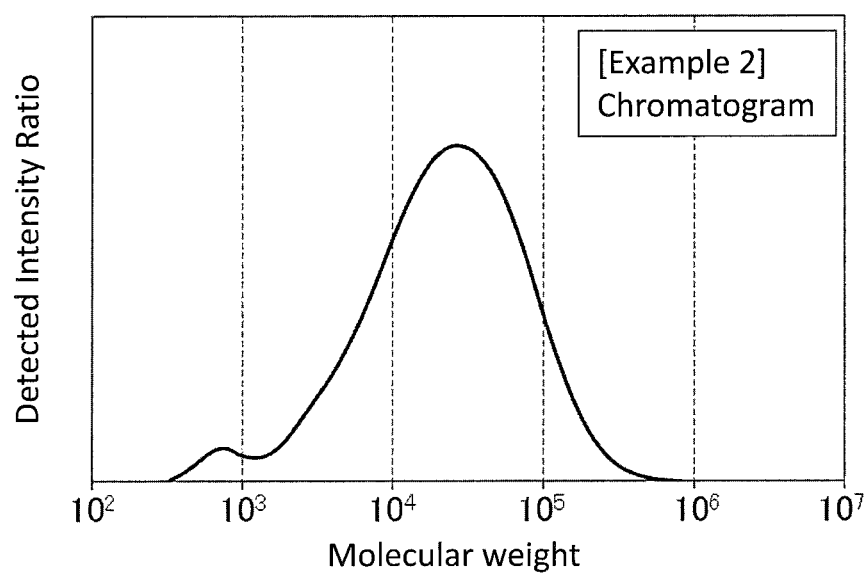
FIG. 2 is a GPC chart of the PPS resin composition obtained in Example 2.
Figure 3:
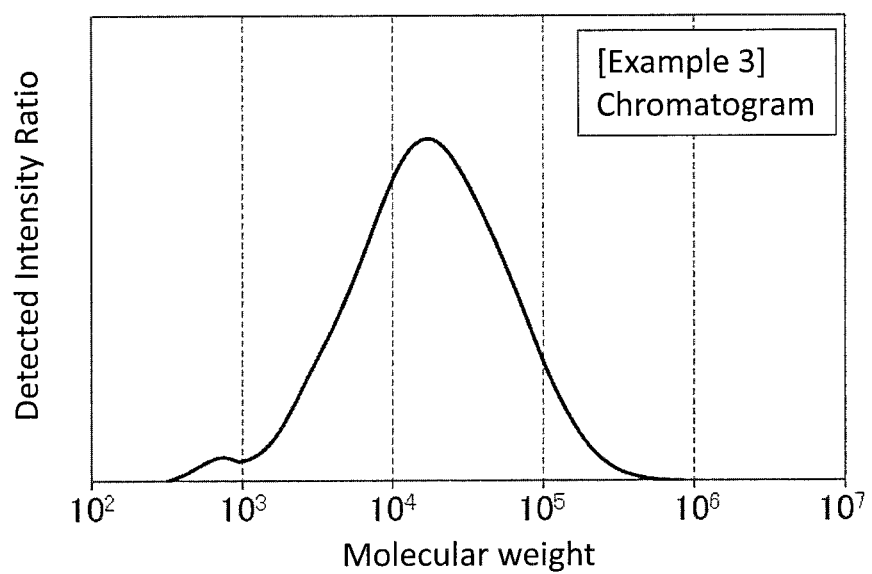
FIG. 3 is a GPC chart of the PPS resin composition obtained in Example 3.
Figure 4:
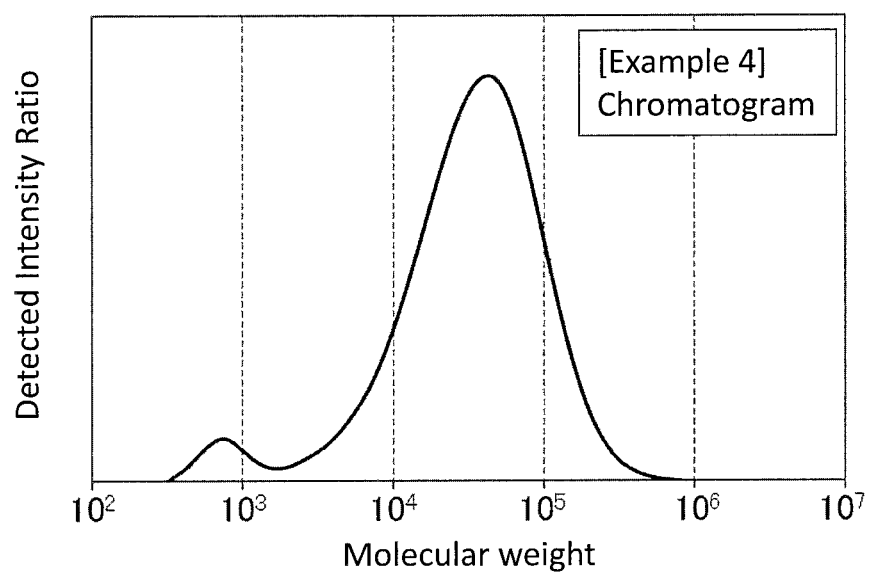
FIG. 4 is a GPC chart of the PPS resin composition obtained in Example 4.
Figure 5:
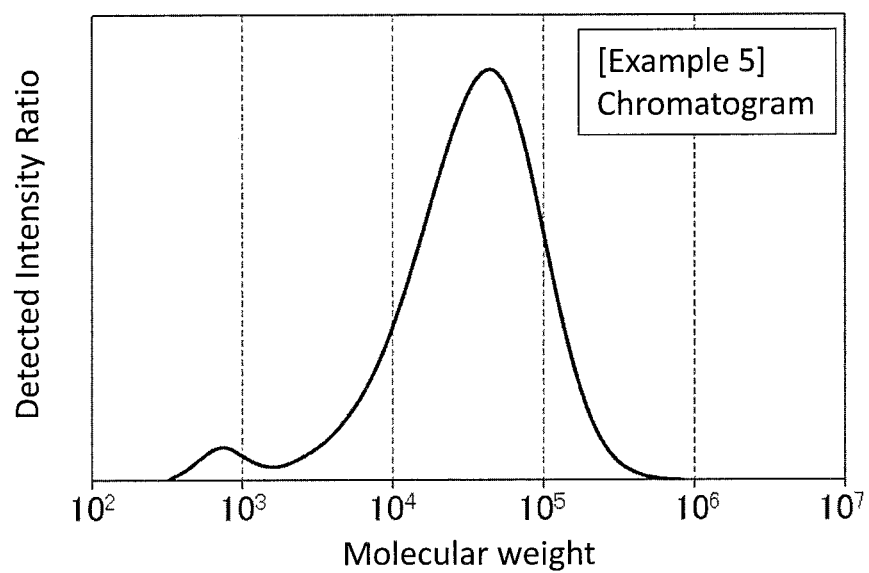
FIG. 5 is a GPC chart of the PPS resin composition obtained in Example 5.
Figure 6:
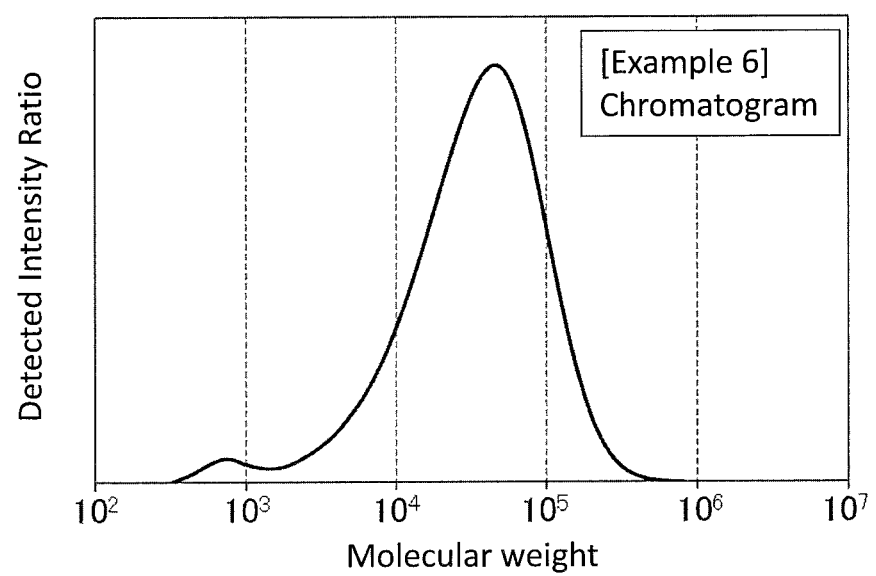
FIG. 6 is a GPC chart of the PPS resin composition obtained in Example 6.
Figure 7:
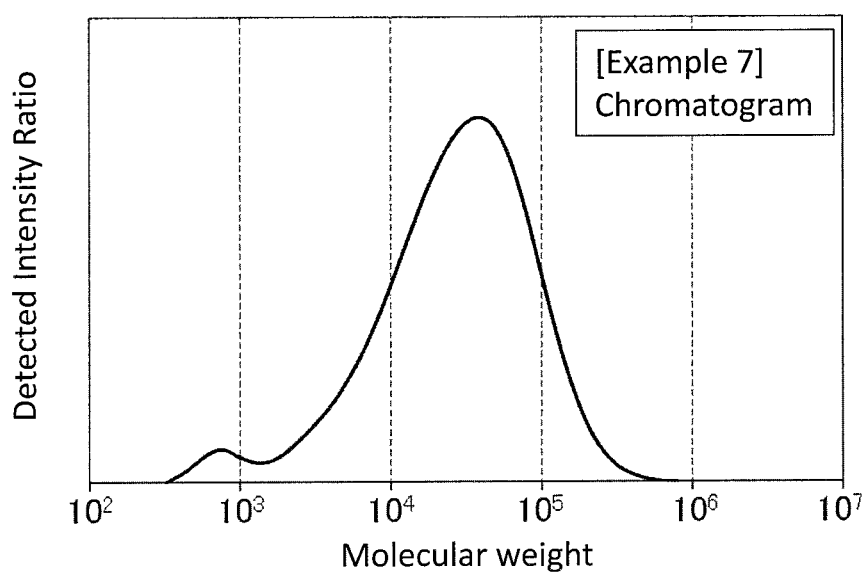
FIG. 7 is a GPC chart of the PPS resin composition obtained in Example 7.

Examples will be described below.

1. PPS Resin

A PPS resin is a polymer having a repeating unit represented by the following Formula:

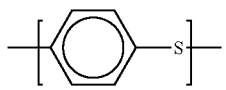

From the viewpoint of heat resistance, the PPS resin is preferably a polymer which contains a repeating unit represented by the aforementioned structural formula in an amount of 80% by mole or more, preferably 90% by mole or more. The PPS resin also has the repeating unit(s) less than 20% by mole of which may be constituted of the repeating unit(s) represented by structures (B) to (L).

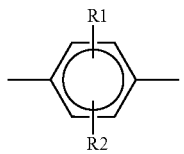 (B)

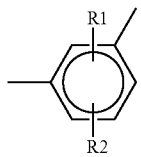 (C)

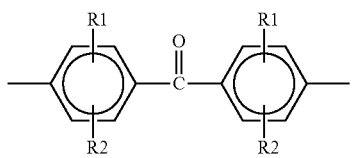 (D)

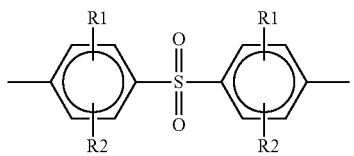 (E)

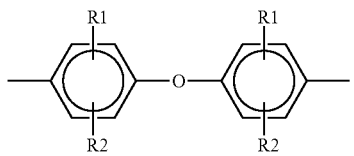 (F)

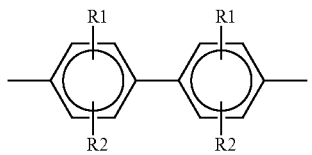 (G)

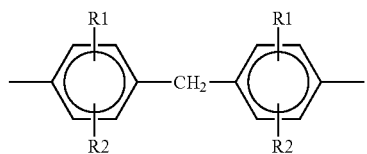 (H)

 (I)

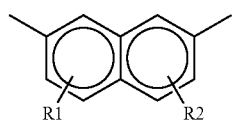 (J)

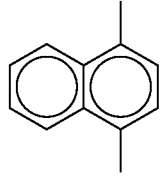 (K)

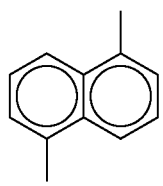 (L)

(R1 and R2 are substituents selected from hydrogen, $C_1$-$C_{12}$ alkyl groups, $C_1$-$C_{12}$ alkoxy groups, $C_6$-$C_{24}$ arylene groups, and halogen groups; and R1 and R2 may be the same or different.)

As long as such a repeating unit is the main constituent unit, the PPS resin may contain a small amount of branch unit or cross-linking unit represented by any of the following Formula (M) to Formula (O) and the like. The copolymerization amount of such a branch unit or cross-linking unit is preferably 0 to 1% by mole relative to 1 mole of the repeating unit.

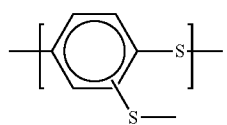 (M)

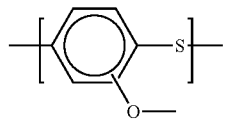 (N)

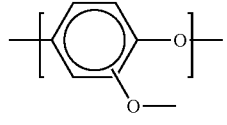 (O)

2. PPS Resin (a) Having a Weight Average Molecular Weight of 50,000 or More and Having a ΔWr of 0.18% or Less The PPS resin (a) has a weight average molecular weight of 50,000 or more, preferably 55,000 or more, more preferably 60,000 or more, still more preferably 65,000 or more. When the PPS resin (a) has a weight average molecular weight of less than 50,000, the molecular weight is insufficiently different from that of the below-mentioned PPS resin (b), resulting in a larger viscosity increase caused in molding the obtained PPS resin composition. The weight average molecular weight does not have a particular upper limit, but an example is preferably 1,000,000 or less, more preferably 500,000 or less, still more preferably 200,000 or less, and these ranges have a tendency to afford a PPS resin composition having high molding-processability.

A molecular weight of a PPS resin can be determined by size exclusion chromatography (SEC) including a differential refractive index detector on the basis of a calibration curve made by a relational expression between a molecular weight and a retention time, in which the relational expression is obtained by measuring a reference material whose molecular weight is known, and the molecular weight values and the charts of the PPS resin were measured by gel permeation chromatography (GPC), which is a type of SEC, using polystyrene as a reference material.

A polydispersity index obtained by dividing a weight average molecular weight of the PPS resin (a) by a number average molecular weight thereof is preferably 2.5 or less, more preferably 2.3 or less, still more preferably 2.1 or less, further more preferably 2.0 or less. A polydispersity index in the aforementioned ranges has a tendency to reduce the amount of gas generated in molding the resulting PPS resin composition.

A significant characteristic of the PPS resin (a) is that the weight reduction ratio ΔWr is 0.18% or less when the PPS resin is heated, in which the weight reduction ratio is represented by Equation (1):

$$\Delta Wr = (W1 - W2)/W1 \times 100 (\%) \quad (1)$$

(wherein ΔWr is a weight reduction ratio (%), which is a value determined from a sample weight (W1) at 100° C. reached and a sample weight (W2) at 330° C. reached in thermogravimetric analysis carried out under a non-oxidizing atmosphere at normal pressure at a temperature raising rate of 20° C./minute).

The ΔWr of the PPS resin (a) is 0.18% or less, preferably 0.12% or less, more preferably 0.10% or less, still more preferably 0.085% or less. The ΔWr of more than 0.18% will increase the amount of gas generated in molding the resulting PPS resin composition.

The ΔWr can be determined by general thermogravimetric analysis, and a non-oxidizing atmosphere at normal pressure is used as an atmosphere in this analysis. The non-oxidizing atmosphere refers to an atmosphere that substantially does not contain oxygen, in other words, an atmosphere of an inert gas such as nitrogen, helium, or argon. Among these, a nitrogen atmosphere is particularly preferable from the viewpoint of economical efficiency and easy handling.

The normal pressure refers to a pressure in the normal state or a similar state of the atmosphere and to an atmospheric condition at or near an absolute pressure of 101.3 kPa at or near a temperature of about 25° C.

A measurement of ΔWr is made by thermogravimetric analysis carried out raising temperature from 50° C. to 350° C. at a temperature raising rate of 20° C./minute. Preferably, thermogravimetric analysis is carried out raising temperature at a temperature raising rate of 20° C./minute after the temperature is held at 50° C. for 1 minute. This temperature range is not only a temperature region that is frequently used when PPS resins are practically used, but also a temperature region that is frequently used when PPS resins are molded into any shape after the PPS resins in the solid state are melted. In such a temperature region, the weight reduction ratio is associated with the amount of gas generated from the PPS resin in practical usage and with the amount of deposit component attached to spinnerets and metal molds in molding. Accordingly, it can be said that a PPS resin whose weight reduction ratio in such a temperature range is small is an excellent PPS resin having high quality. A measurement of ΔWr is desirably made in a sample amount of about 10 mg, and the form of a sample is desirably granules each about 2 mm or less.

The amount of alkali metal contained in the PPS resin (a) has no particular limit, and from the viewpoint of applying the resin composition to parts and materials for which electrical insulating properties are demanded, an alkali metal content of 700 ppm by weight or less can be exemplified as a preferable range, and the alkali metal content of 700 ppm by weight or less is preferable because such a content can prevent electrical insulating properties from being reduced by metal impurities. From the viewpoint of the aforementioned reduction in electrical insulating properties, the alkali metal content of the PPS resin (a) is more preferably 500 ppm by weight or less, still more preferably 200 ppm or less, further more preferably 100 ppm or less.

The alkali metal content of the PPS resin means a value calculated from the amount of alkali metal contained in an ash obtained as a residue when the PPS resin is burned, for example, in an electric oven or the like. By analyzing the ash by, for example, high-frequency inductively coupled plasma (ICP) emission spectroscopy or atomic absorption spectrometry, the alkali metal content can be quantitated. In particular, ICP emission spectroscopy is a technique generally used to quantitate trace elements because it can analyze multiple elements at the same time and with high sensitivity.

In this respect, alkali metals refer to lithium, sodium, potassium, rubidium, cesium, and francium, and the PPS resin (a) preferably does not contain any alkali metal other than sodium. Containing an alkali metal other than sodium has a tendency to adversely affect the electric property and thermal property of the PPS resin.

In addition, the PPS resin (a) preferably generates a remarkably smaller amount of lactone-type compound and/or aniline-type compound when heated. Examples of lactone-type compounds include β-propiolactone, β-butyrolactone, β-pentanolactone, β-hexanolactone, β-heptanolactone, β-octanolactone, β-nonalactone, β-decalactone, γ-butyrolactone, γ-valerolactone, γ-pentanolactone, γ-hexanolactone, γ-heptanolactone, γ-octalactone, γ-nonalactone, γ-decalactone, δ-pentanolactone, δ-hexanolactone, δ-heptanolactone, δ-octanolactone, δ-nonalactone, δ-decalactone, and the like. Examples of aniline-type compounds include aniline, N-methylaniline, N,N-dimethylaniline, N-ethylaniline, N-methyl-N-ethylaniline, 4-chloro-aniline, 4-chloro-N-methylaniline, 4-chloro-N,N-dimethyl aniline, 4-chloro-N-ethylaniline, 4-chloro-N-methyl-N-ethylaniline, 3-chloro-aniline, 3-chloro-N-methylaniline, 3-chloro-N,N-dimethylaniline, 3-chloro-N-ethylaniline, 3-chloro-N-methyl-N-ethylaniline, and the like.

The amount of the lactone-type compound generated is preferably 500 ppm or less, more preferably 300 ppm or less, still more preferably 100 ppm or less, further more preferably 50 ppm or less, by weight relative to the PPS resin (a) prior to heating. Similarly, the amount of the aniline-type compound generated is preferably 300 ppm or less, more preferably 100 ppm or less, still more preferably 50 ppm or less, further more preferably 30 ppm or less. If the amount of the lactone-type compound and/or the aniline-type compound generated by heating the PPS resin is in the aforementioned preferable ranges, it is less likely to cause the foaming of the resin, deposits on metal molds or the like in molding, and it will enhance productivity and not cause the pollution of the surrounding environment. Examples of methods of evaluating the amount of the lactone-type compound and/or the aniline-type compound generated by heating the PPS resin include a method in which a gas generated when the resin is heat-treated under a non-oxidizing gas stream at 320° C. for 60 minutes is separated into components by gas chromatography and then quantitated.

A process of producing the PPS resin (a) is not limited to a particular one as long as it affords a PPS resin having the aforementioned characteristics, and examples of preferable processes include a method of producing a PPS resin disclosed in WO2007/034800. Specific examples of production processes can include a process in which a PPS prepolymer including an at least 50% by weight or more of a cyclic PPS represented by Formula (A) and having a weight average molecular weight of less than 10,000 is heated and converted into a high polymerization degree product having a weight average molecular weight of 10,000 or more. This process can easily afford a PPS resin having the aforementioned characteristics.

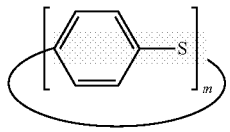

(A)

(wherein m is an integer of 4 to 20; and the cyclic PPS may be a mixture of compounds represented by the General Formula (A) which have different m values from 4 to 20).

PPS prepolymer

A preferable process of producing the PPS resin (a) is characterized by heating a PPS prepolymer including a cyclic PPS and converting the prepolymer into a high polymerization degree product. The amount of the cyclic PPS contained in the PPS prepolymer used in a process of producing the PPS resin (a) is preferably 85% by weight or more, more preferably 90% by weight or more, still more preferably 93% by weight or more, further more preferably 95% by weight or more. With a cyclic PPS content of 85% by weight or more, heating the PPS prepolymer has a tendency to more easily afford a high polymerization degree PPS resin having a weight average molecular weight of 50,000 or more. In addition, the cyclic PPS contained in the PPS prepolymer does not have a particular upper limit, but a preferable example of the range thereof is 98% by weight or less. This range has a tendency to allow a lower melting temperature for the PPS prepolymer and a lower temperature for heating.

The polymerization degree of the PPS resin obtained after heating usually has a tendency to be higher as the cyclic PPS content in the PPS prepolymer is higher. In other words, adjusting the cyclic PPS content in the PPS prepolymer can facilitate adjusting the polymerization degree of the resulting PPS resin. A component other than the cyclic PPS in the PPS prepolymer is preferably a linear PPS, and the structure thereof is preferably in accordance with Item 1. Process of producing PPS prepolymer Examples of processes of obtaining a PPS prepolymer include a production process disclosed in WO2013/061561. A PPS prepolymer can be obtained by the steps of: heating a reaction mixture containing a sulfidizing agent, a dihalogenated aromatic compound, and an organic polar solvent, in which mixture the arylene unit per mol of sulfur component is 0.80 mol to less than 1.05 mol; allowing the reaction mixture to react until 50% or more of the sulfidizing agent is consumed by the reaction; then adding the dihalogenated aromatic compound to the reaction mixture such that the arylene unit per mol of sulfur component in the reaction mixture is 1.05 mol to 1.50 mol; heating the mixture further for reaction; preparing a reaction product including at least a cyclic PPS and a linear PPS polyarylene sulfide; separating the mixture into solid and liquid; and purifying and collecting the PPS component from the filtrate. Conversion of PPS prepolymer to high polymerization degree product A preferable process of producing the PPS resin (a) is characterized by heating a PPS prepolymer including a cyclic PPS and by converting the prepolymer into a high polymerization degree product, and the temperature for heating is preferably such that the PPS prepolymer is melted, and has no particular limit as long as such a temperature condition is satisfied. When the heating temperature is in the aforementioned preferable range, the high polymerization degree product does not take a long time to obtain. A temperature at which the PPS prepolymer is melted cannot be unequivocally specified because such a temperature varies depending on the composition and molecular weight of the PPS prepolymer and the environment in which the prepolymer is heated, but an example of the lower limit of the heating temperature is 180° C. or more, preferably 200° C. or more, more preferably 250° C. or more. In these preferable ranges, the PPS prepolymer has a tendency to melt rapidly and shorten the time required to obtain a high polymerization degree product. An example of the upper limit of the heating temperature is 400° C. or less, preferably 380° C. or less, more preferably 360° C. or less. In these preferable ranges, undesirable side reactions typified by cross-linking reaction and decomposition reaction between PPS prepolymers, between high polymerization degree products produced by heating, between a high polymerization degree product and a PPS prepolymer, and between the like can be avoided, and the characteristics of the resulting PPS do not degrade.

The heating time varies depending on the various properties such as the cyclic PPS content, m value, molecular weight in the PPS prepolymer used and on the conditions such as temperature for heating, and then cannot be unequivocally defined, but an example of the lower limit of the heating time is preferably 3 minutes or more, preferably 6 minutes or more, more preferably 1 hour or more. In these preferable ranges, the PPS prepolymer is sufficiently converted into PPS. An example of the upper limit is 100 hours or less, more preferably 20 hours or less, more preferably 10 hours or less. In these preferable ranges, the aforementioned undesirable side reactions can be avoided.

Heating is preferably carried out under a non-oxidizing atmosphere and also preferably carried out under a vacuum condition. When the heating is carried out under a vacuum condition, it is preferable to control the atmosphere in the reaction system first to a non-oxidizing atmosphere and then to a vacuum condition. This operation has a tendency to suppress the aforementioned undesirable side reactions. The vacuum condition means that the pressure in the reaction system is lower than the atmospheric pressure, and the upper limit is preferably 50 kPa or less, more preferably 20 kPa or less, still more preferably 10 kPa or less. At 50 kPa or less, this operation has a tendency to suppress the aforementioned undesirable side reactions. On the other hand, an example of the lower limit is 0.1 kPa or more. In these preferable ranges of the vacuum condition, a cyclic PPS having a low molecular weight contained in the PPS prepolymer volatilizes less easily.

The upper limit of the amount of the cyclic PPS contained in the PPS resin subsequent to the heating of the PPS prepolymer is preferably 40% by weight or less, more preferably 30% by weight or less, still more preferably 20% by weight or less, further more preferably 10% by weight or less, relative to the weight of the PPS resin. The cyclic PPS content of 40% or less contained in the PPS resin (a) has a tendency to reduce a viscosity increase caused in molding the PPS resin composition. On the other hand, the lower limit is preferably 2% or more, more preferably 4% or more, still more preferably 6% or more. The cyclic PPS content of 2% or more contained in the PPS resin (a) has a tendency to afford a PPS resin composition having excellent flowability. The content of the cyclic PPS can be controlled to the aforementioned preferable ranges by, for example, adjusting the heating time for the PPS prepolymer.

The content of the cyclic PPS in the PPS resin can be calculated from the area fraction of a subpeak in the GPC chart of the PPS resin.

3. PPS resin (b) having a weight average molecular weight of less than 50,000 and an alkaline earth metal content of less than 200 ppm, and having an increase rate of molecular weight of 5.0% or less when the resin is heated at 320° C. for 10 minutes together with 0.5% by weight of 2-(3,4-epoxycyclohexyl)ethyltrimethoxysilane added thereto The PPS resin (b) has a weight average molecular weight of less than 50,000, preferably 40,000 or less, more preferably 30,000 or less, still more preferably 20,000 or less. When the PPS resin (b) has a weight average molecular weight of 50,000 or more, the molecular weight is insufficiently different from that of the aforementioned PPS resin (a), resulting in a larger viscosity increase caused in molding the resulting PPS resin composition. The weight average molecular weight does not have a particular lower limit, but an example of the range thereof is preferably 3,000 or more, more preferably 4,000 or more, still more preferably 5,000 or more, and these ranges have a tendency to reduce the amount of gas generated in molding the resulting PPS resin composition.

The amount of alkaline earth metal contained in the PPS resin (b) is less than 200 ppm by weight, more preferably 150 ppm or less, still more preferably 100 ppm or less. The alkaline earth metal content of 200 ppm or more reduces the molding-processability of the resulting PPS resin composition. It is inferred that the reason is the precipitation of an excessive amount of alkaline earth metal.

The alkaline earth metal content of the PPS resin means a value calculated from the amount of alkaline earth metal contained in an ash obtained as a residue when the PPS resin is burned, for example, in an electric oven or the like. By analyzing the ash by, for example, ICP emission spectroscopy or atomic absorption spectrometry, the alkali metal content can be quantitated. In this regard, alkaline earth metals refer to calcium, strontium, barium, and radium.

A characteristic of the PPS resin (b) is that the increase rate of molecular weight (ΔMn) is 5.0% or less when the PPS resin with 0.5% by weight of 2-(3,4-epoxycyclohexyl)ethyltrimethoxysilane added thereto is heated, in which the increase rate of molecular weight is represented by Equation (2):

$$\Delta Mn = (Mn2 - Mn1)/Mn1 \times 100(\%) \quad (2)$$

(wherein ΔMn is an increase rate of molecular weight (%), which is determined from: a number average molecular weight (Mn1) of a PPS resin measured after the PPS resin is heated at 320° C. for 10 minutes without 2-(3,4-epoxycyclohexyl)ethyltrimethoxysilane added thereto; and a number average molecular weight (Mn2) measured after the PPS resin is heated at 320° C. for 10 minutes together with 0.5% by weight of 2-(3,4-epoxycyclohexyl)ethyltrimethoxysilane added thereto.)

The ΔMn is associated with the content of active functional groups in the PPS resin which are typified by carboxyl groups, thiol groups, hydroxyl groups, and the like and, hence, is preferably smaller from the viewpoints of reduction in a viscosity increase due to side reactions such as cross-linking caused and reduction in the amount of gas generated in molding the PPS resin.

The increase rate of molecular weight ΔMn of the PPS resin (b) is 5.0% or less, preferably 4.0% or less, more preferably 3.0% or less, still more preferably 2.0% or less. A ΔMn of more than 5.0% will raise a viscosity increase caused and/or the amount of gas generated in molding the resulting PPS resin composition.

For the atmosphere under which the aforementioned heating is carried out, a non-oxidizing atmosphere at normal pressure is used. If the oxygen concentration is more than 5% by volume, the PPS resin undergoes oxidation or the like when heated, whereby a ΔMn reflecting the actual content of functional groups may fail to be achieved.

In addition, the PPS resin (b) preferably generates a remarkably smaller amount of lactone-type compound when heated. The amount of the lactone-type compound generated when the PPS resin (b) is heated is preferably 500 ppm or less, more preferably 300 ppm or less, still more preferably 100 ppm or less, further more preferably 50 ppm or less, by weight relative to the PPS resin prior to heating.

A process of producing the PPS resin (b) is not limited to a particular one as long as it affords a PPS resin having the aforementioned characteristics, and examples of such production processes include a process in which the solvent is removed from the solid in the solid-liquid separation of the reaction mixture in the PPS prepolymer production process described in Item 2. When the solvent is removed, washing treatment is also preferably carried out with ion exchanged water, acetic acid aqueous solution, calcium acetate aqueous solution, and the like because the treatment has a tendency to reduce the contents of alkali metal and substances causative of coloring in the PPS resin. This process can easily afford a PPS resin having the aforementioned characteristics.

Examples of other processes of producing the PPS resin (b) include a process that involves the use of a PPS prepolymer having a smaller content of cyclic PPS in the process described in Item 2 for producing the PPS resin by heating the PPS prepolymer including the cyclic PPS. Specifically, a PPS resin having the aforementioned characteristics can be easily obtained by heating a PPS prepolymer having a cyclic PPS content of less than 80% by weight.

4. PPS resin (c) containing 200 to 800 ppm of an alkaline earth metal (d) and having a ΔWr of more than 0.18

The PPS resin (c) is not limited to a particular molecular weight, but an example of the lower limit range thereof is preferably 10,000 or more, more preferably 15,000 or more, still more preferably 18,000 or more, in terms of the weight average molecular weight. These ranges have a tendency to reduce the amount of gas generated in molding the resulting PPS resin composition. On the other hand, an example of the upper limit range is preferably less than 1,000,000, more preferably less than 500,000, still more preferably less than 200,000, and these ranges have a tendency to afford a PPS resin composition having high molding-processability.

The lower limit of the alkaline earth metal (d) content of the PPS resin (c) is 200 ppm, preferably 300 ppm or more, more preferably 400 ppm or more. An alkaline earth metal content of less than 200 ppm raises a viscosity increase caused in molding the resulting PPS resin composition. On the other hand, the upper limit of the content is 800 ppm, and a content of more than 800 ppm reduces the flowability in molding the resulting PPS resin composition.

The alkaline earth metal (d) contained in the PPS resin (c) is at least one selected from calcium, strontium, barium, and radium. The alkaline earth metal may be contained singly or in mixture of two or more kinds thereof. From the viewpoint of reducing a viscosity increase caused in molding the resulting PPS resin composition, it is preferable to increase the mole content of alkaline earth metal contained in the PPS resin (c), and hence calcium, which has the smallest atomic weight, is particularly preferable.

The PPS resin (c) is characterized in that the weight reduction ratio $\Delta Wr$ is more than 0.18% when the PPS resin is heated, in which the weight reduction ratio is represented by Equation (1). A $\Delta Wr$ of 0.18% or less reduces affinity with alkaline earth metal and raises a viscosity increase caused in molding the resulting PPS resin composition. On the other hand, the upper limit of $\Delta Wr$ is preferably 0.40% or less, more preferably 0.30% or less, still more preferably 0.25% or less, from the viewpoint of reducing the amount of gas generated in molding the resulting PPS resin composition. These preferable ranges have a tendency to reduce the amount of gas generated in molding the resulting PPS resin composition.

A process of producing the PPS resin (c) is not limited to a particular one as long as it affords a PPS resin having the aforementioned characteristics, and specific examples of processes include a process of producing a PPS resin disclosed in WO2013/099234, in which process a PPS resin is obtained by a solution polymerization process that involves the reaction between an alkali metal sulfide such as sodium sulfide and a dihalogenated aromatic compound such as p-dichlorobenzene in an organic amide solvent such as N-methyl-2-pyrrolidone, and the PPS resin is collected while in contact with a solution containing an alkaline earth metal salt. This process can easily afford a PPS resin having the aforementioned characteristics.

5. Blending PPS Resin (a) and PPS Resin (b) and/or PPS Resin (c)

90 to 50% by weight of the PPS resin (a) is blended with either the PPS resin (b) alone or the PPS resin (c) alone in an amount 10 to 50% by weight or blended with the PPS resin (b) and the PPS resin (c) in the total amount of 10 to 50% by weight, relative to the total weight of the PPS resin (a), the PPS resin (b), and the PPS resin (c) as 100% by weight. The upper limit of the amount of the PPS resin (a) to be blended is 90% by weight, and an amount of more than 90% by weight (blended with the PPS resin (b) and the PPS resin (c) in the total amount of less than 10% by weight) raises a viscosity increase caused in molding the resulting PPS resin composition. On the other hand, the lower limit of the amount of the PPS resin (a) to be blended is 50% by weight, more preferably 60% by weight, still more preferably 70% by weight. Less than 50% by weight of the PPS resin (a) (blended with the PPS resin (b) and the PPS resin (c) in the total amount of more than 50% by weight) raises the amount of gas generated in molding the resulting PPS resin composition.

The PPS resin (a) is preferably blended with the PPS resin (b) alone among others from the viewpoint of reducing the amount of gas generated in heating the resulting PPS resin composition. On the other hand, the PPS resin (a) is preferably blended with the PPS resin (c) alone from the viewpoint of suppressing an excessive increase in the flowability of the resulting PPS resin composition. The use of both the PPS resin (b) and the PPS resin (c) is also preferable because it has a tendency to further reduce a viscosity increase caused in molding the resulting PPS resin composition.

A process of blending two or more kinds of PPS resins including the PPS resin (a) is not limited to a particular one, but examples of such processes include a process in which the PPS resins are dry-blended at the aforementioned blending ratio, supplied into a commonly known melt kneading machine such as a single screw extruder, a twin screw extruder, a Banbury mixer, a kneader, or a mixing roll, and melt-mixed at a temperature that is the same as or higher than the melting temperature of the PPS resin.

The upper limit of the temperature at which the melt mixing is carried out is preferably 380° C. or less, more preferably 360° C. or less, still more preferably 340° C. or less, further more preferably 320° C. or less. These ranges have a tendency to avoid undesirable side reactions such as cross-linking.

In addition, a preferable melt mixing time can vary depending on the temperature at which the melt mixing is carried out, but an example of the time range is preferably 1 minute or more, more preferably 3 minutes or more, still more preferably 5 minutes or more. These ranges have a tendency to allow raw material PPS resins to melt sufficiently and to afford a PPS resin composition having high uniformity. On the other hand, the upper limit is preferably 30 minutes or less, more preferably 20 minutes or less, still more preferably 15 minutes or less. These ranges have a tendency to suppress the aforementioned undesirable side reactions.

In addition, the melt mixing is preferably carried out in a non-oxidizing atmosphere from the viewpoint of suppressing the aforementioned undesirable side reactions, and also preferably carried out under a vacuum condition from the viewpoint of reducing the amount of gas generated in molding the resulting PPS resin composition.

6. PPS Resin Composition Obtained by Blending PPS Resin (a) and PPS Resin (b) and/or PPS Resin (c)

In addition, the PPS resin composition is characterized in that, in a molecular weight distribution measured in size exclusion chromatography, the PPS resin composition (i) has a peak top of a main peak in a molecular weight region of 10,000 to 1,000,000, and
(ii) has a peak top of a subpeak in a molecular weight region of 100 to less than 10,000;

and (iii) that the area fraction of a subpeak (FS2) is 1.0 to 20%, in which the area fraction is calculated, in accordance with Equation (3), from an area value S1 of a region for which the molecular weights are from M to 10,000,000 and an area value S2 of a region for which the molecular weights are from 100 to M, wherein M is a molecular weight for the minimal point between the aforementioned main peak and subpeak.

$$F_{S2} = S2/(S1+S2) \times 100(\%) \tag{3}$$

As size exclusion chromatography, specifically gel permeation chromatography (GPC) using polystyrene as a reference material is adopted.

In addition, the PPS resin composition is characterized in that the change rate of viscosity ($\Delta\eta_{300}$) represented by Equation (4) is 1.5 times or less when the composition is heated at 320° C. for 5 hours.

$$\Delta\eta_{300} = \eta_{300}/\eta_0 \tag{4}$$

(wherein $\Delta\eta_{300}$ is a change rate of viscosity (times), which is a value determined from a melt viscosity m prior to heating treatment and a melt viscosity $\eta_{300}$ subsequent to heating treatment at 320° C. for 5 hours in a non-oxidizing atmosphere at normal pressure.)

The lower limit of $F_{S2}$ of the PPS resin composition is 1.0%, preferably 2.0% or more, more preferably 3.0% or more. An $F_{S2}$ of less than 1.0% reduces the flowability in molding. On the other hand, the upper limit of $F_{S2}$ is 20%, more preferably 15% or less, still more preferably 10% or less, further more preferably 5% or less. An $F_{S2}$ value of more than 20% raises the viscosity increase in molding.

As an example of a chart of a molecular weight distribution of the PPS resin composition, a chart obtained in Example 1 is shown in FIG. 1. As used herein, a molecular weight distribution having two peaks as shown in FIG. 1 may be referred to as a bimodal molecular weight distribution.

The peak top molecular weight of a main peak component of the PPS resin is 10,000 or more, preferably 15,000 or more, more preferably 18,000 or more, still more preferably 20,000 or more. A peak top molecular weight of less than 10,000 raises the amount of gas generated in molding the resulting PPS resin composition. On the other hand, the upper limit is 1,000,000 or less, preferably 500,000 or less, more preferably 200,000 or less, still more preferably 100,000 or less. A peak top molecular weight of more than 1,000,000 reduces the molding-processability of the resulting PPS resin composition.

The peak top molecular weight of a subpeak of the PPS resin composition is less than 10,000, preferably 5,000 or less, more preferably 3,000 or less, still more preferably 2,000 or less. A peak top molecular weight of 10,000 or more reduces the flowability in molding of the resulting PPS resin composition. On the other hand, the lower limit is 100 or more, preferably 300 or more, more preferably 400 or more, still more preferably 500 or more. A peak top molecular weight of less than 100 raises the amount of gas generated in molding the resulting PPS resin composition.

The weight average molecular weight of a main peak of the PPS resin composition is 10,000 or more, preferably 20,000 or more, more preferably 25,000 or more, still more preferably 30,000 or more. A peak top molecular weight of less than 10,000 raises the amount of gas generated in molding the resulting PPS resin composition. On the other hand, the upper limit is preferably 2,000,000, preferably 1,000,000 or less, more preferably 500,000 or less, still more preferably 200,000 or less. These ranges have a tendency to afford a PPS resin composition having high molding-processability.

The weight average molecular weight of a subpeak of the PPS resin composition is preferably less than 10,000, more preferably 8,000 or less, still more preferably 5,000 or less, further more preferably 3,000 or less. These ranges have a tendency to afford a PPS resin composition having high flowability. On the other hand, the lower limit is 100 or more, preferably 300 or more, more preferably 400 or more, still more preferably 500 or more. A peak top molecular weight of less than 100 raises the amount of gas generated in molding the resulting PPS resin composition.

The melt viscosity of the PPS resin composition has no particular limit, but usually an example of a melt viscosity range at 320° C. is preferably 1 Pa·s or more, more preferably 10 Pa·s or more, still more preferably 20 Pa·s or more. On the other hand, the upper limit is preferably 10,000 Pa·s or less, more preferably 5,000 Pa·s or less, still more preferably 3,000 Pa·s or less. Having a melt viscosity in these ranges has a tendency to afford excellent molding-processability.

The upper limit of $\Delta\eta_{300}$ of the PPS resin composition is 1.5 times, more preferably 1.3 times or less, still more preferably 1.2 times or less, further more preferably 1.1 times or less. A $\Delta\eta_{300}$ of more than 1.5 times raises the viscosity increase in molding. On the other hand, the lower limit of $\Delta\eta_{300}$ has no particular limit, but an example of the range thereof is preferably 0.5 times or more, more preferably 0.7 times or more, still more preferably 0.8 times or more, further more preferably 0.9 times or more, and these ranges have a tendency to stabilize the melt viscosity in molding.

A melt viscosity can be measured using a known viscometer such as a rheometer, a capillary rheometer, or a rotational viscometer, and can also be calculated from a melt flow rate measured using a known flow measuring device such as a melt indexer or a flowmeter.

A method of carrying out the aforementioned heating treatment is not limited to a particular one, but examples of such methods include: a method in which a sample is added to a test tube, the inside of the system is filled with a non-oxidizing atmosphere at normal pressure, and heating treatment is then carried out using an electric oven, a metal bath, or the like for which the temperature is controlled to 320° C.; and a method in which a melt viscosity is measured at 320° C. in a non-oxidizing atmosphere in a viscometer prior to heating treatment and the sample is heated in the device without being removed after the measurement.

The heating treatment in measuring the melt viscosity is preferably carried out in a non-oxidizing atmosphere at normal pressure. The non-oxidizing atmosphere in which the heating treatment is carried out is similar to an atmosphere practically used in molding the PPS resin, and hence is appropriate as an index of melt stability of the PPS resin in practical usage.

The heating temperature during the measurement of the melt viscosity is 320° C. that is the same as or higher than the melting temperature of the PPS resin composition, and the temperature of 320° C. is similar to a temperature that is frequently used when the PPS resin is practically molded. The PPS resin whose change rate of viscosity is small at 320° C. can be said to be an excellent PPS resin having high quality, the viscosity increase of which resin in a practical usage temperature region is suppressed.

Preferably, the PPS resin composition also contains an amount of alkaline earth metal from the viewpoint of reducing a viscosity increase caused in molding. A preferable example is 20 ppm or more, preferably 30 ppm or more, more preferably 40 ppm or more. A content of 20 ppm or more has a tendency to reduce the viscosity increase in molding. On the other hand, the upper limit is preferably 1,000 ppm or less, more preferably 500 ppm or less, still more preferably 400 ppm or less. An alkaline earth metal content of 1,000 ppm or less has a tendency to provide excellent molding-processability.

The PPS resin composition has a weight reduction ratio $\Delta Wr$ when heated that is preferably 0.30% or less, in which the weight reduction ratio is represented by Equation (1). The weight reduction ratio is more preferably 0.24% or less, still more preferably 0.20% or less, further more preferably 0.18% or less. The $\Delta Wr$ value that is in or lower than the aforementioned ranges has a tendency to reduce the amount of gas generated in molding.

In addition, the PPS resin composition preferably generates a smaller amount of lactone-type compound and/or aniline-type compound when heated. The amount of the lactone-type compound generated when the PPS resin composition is heated is preferably 800 ppm or less, more preferably 500 ppm or less, still more preferably 300 ppm or less, further more preferably 100 ppm or less, by weight relative to the PPS resin composition prior to heating. Similarly, the amount of the aniline-type compound generated is preferably 300 ppm or less, more preferably 200 ppm or less, still more preferably 100 ppm or less, further more preferably 50 ppm or less.

EXAMPLES

Our processes will be more specifically described below with reference to Examples and Comparative Examples, but this disclosure is not limited to the following Examples. The methods of measuring properties are as follows: Analysis of PPS Prepolymer The cyclic PPS contained in the PPS prepolymer was quantitated using high performance liquid chromatography (HPLC). Measurement conditions for the HPLC are shown below.

Apparatus: LC-10Avp Series, manufactured by Shimadzu Corporation
Column: Mightysil RP-18 GP150-4.6 (5 μm), manufactured by Kanto Chemical Co., Inc.
Detector: photodiode array detector (270 nm)

The cyclic PPS was quantitated from an area ratio of the total value of the detected areas of all peaks detected in the HPLC analysis to the total value of the detected areas of the peaks derived from the cyclic PPS.
Measurement of Molecular Weight The molecular weights of the PPS resin and the resin composition were determined using gel permeation chromatography (GPC), which is a type of size exclusion chromatography (SEC), through calculation in terms of polystyrene. Measurement conditions for the GPC are shown below.

Apparatus: SSC-7110, manufactured by Senshu Scientific Co., Ltd.
Column name: Shodex UT-G+Shodex UT-806M×2, manufactured by Showa Denko K.K.
Eluent: 1-chloronaphthalene
Detector: differential refractive index detector
Column temperature: 210° C.
Pre-thermostatic chamber temperature: 250° C.
Pump thermostatic chamber temperature: 50° C.
Detector temperature: 210° C.
Flow rate: 1.0 mL/min
Sample injection amount: 300 μL (concentration: 0.1% by weight)
Reference sample: polystyrene Measurement of Weight Reduction Ratio Under Heating The weight reduction ratios of the PPS resin and the resin composition which have each been heated were measured under the following conditions using a thermogravimetric analyzer. The sample was granules of 2 mm or smaller size.

Apparatus: TGA7 manufactured by Perkin Elmer, Co.
Atmosphere for measurement: under nitrogen stream
Weight of fed sample: about 10 mg
Measurement Conditions:
(i) hold at the programmed temperature of 50° C. for 1 minute; and
(ii) raise temperature from the programmed temperature of 50° C. to 350° C. at a temperature raising rate of 20° C./minute.

The weight reduction ratio $\Delta Wr$ was calculated by Equation (1) from a sample weight (W1) at 100° C. reached and a sample weight (W2) at 330° C. reached during the temperature raising of (ii).
Quantitation of Alkali Metal Content and Alkaline Earth Metal Content The alkali metal content and alkaline earth metal content of the PPS resin and the resin composition were quantitated by the following methods.
(i) weigh the sample in a quartz crucible and incinerate the weighed sample in an electric oven;
(ii) dissolve the ash in concentrated nitric acid and dilute the solution with dilute nitric acid to a fixed volume; and
(iii) measure the contents of the alkali metal and the alkaline earth metal in the obtained solution by ICP emission spectroscopy (apparatus: Optima 4300DV manufactured by Perkin Elmer, Co.).
Quantitation of Gas Component Generated by Heating The gas components generated by heating the PPS resin and the resin composition were quantitated by the following procedures. The sample was granules of 2 mm or smaller size.
(i) Collection of Gas Component About 10 mg of the sample was heated under a nitrogen stream (50 ml/minute) at 320° C. for 60 minutes, and the generated gas component was collected in a thermal desorption tube for gas collection (manufactured by Supelco/Sigma-Aldrich Co., LLC).
(ii) Analysis of Gas Component The gas component collected in the above tube was subjected to thermal desorption with a temperature rise from room temperature to 280° C. over 5 minutes using a thermal desorption unit (manufactured by Supelco/Sigma-Aldrich Co., LLC). The thermally desorbed component was subjected to component separation by gas chromatography. The amount of γ-butyrolactone in the gas was quantitated as the amount of the lactone-type compound, and the amount of 4-chloro-N-methylaniline was quantitated as the amount of the aniline-type compound.
Measurement of Melt Viscosity and Change Rate of Viscosity The melt viscosity and change rate of viscosity of the PPS resin and the resin composition were measured under the following conditions using a rheometer. Heating treatment at 320° C. was carried out also in a rheometer.

Apparatus: Physica MCR501, manufactured by Anton Paar GmbH
Plate: parallel (φ25 mm)
Gap: 1.0 mm
Angular frequency (ω): 6.28 rad/second
Shearing stress (τ): 1,000 Pa
Weight of fed sample: about 0.7 g
Measurement conditions:
(i) The sample was melted at 320° C. and measured for melt viscosity.

(ii) The sample was heated under a nitrogen stream in a rheometer at 320° C. for 300 minutes and measured at 320° C. for melt viscosity.

The change rate of viscosity $\Delta\eta_{300}$ was calculated using Equation (3) from the melt viscosity ($\eta_0$) prior to heating measured in (i) and the melt viscosity ($\eta_{300}$) subsequent to heating measured in (ii).

Measurement of Increase Rate of Molecular Weight with Addition of 2-(3,4-epoxycyclohexyl)ethyltrimethoxysilane The PPS resin and the resin composition each with 2-(3,4-epoxycyclohexyl)ethyltrimethoxysilane added thereto were measured for increase rate of molecular weight by the following method.

(i) The sample was fed into a test tube; the inside of the test tube was replaced with a nitrogen atmosphere; the sample was heated at 320° C. for 10 minutes; and the molecular weight was measured.

(ii) The same operation was carried out in the same manner as in (i) except that 2-(3,4-epoxycyclohexyl) ethyltrimethoxysilane was added in an amount of 0.5% by weight relative to the weight of the sample.

The increase rate of molecular weight $\Delta Mn$ was calculated using Equation (2) from a number average molecular weight (Mn1) measured in (i) without the addition of 2-(3,4-epoxycyclohexyl)ethyltrimethoxysilane; and a number average molecular weight (Mn2) measured in (ii) with the addition of 2-(3,4-epoxycyclohexyl)ethyltrimethoxysilane.

Reference Example 1

Preparation of First PPS Prepolymer

Reaction in Autoclave Reactor

Into an autoclave reactor with an agitator, 28.1 g of a 48% by weight sodium hydrosulfide aqueous solution (0.241 mol of sodium hydrosulfide), 21.1 g of a 48% by weight sodium hydroxide aqueous solution (0.253 mol of sodium hydroxide), 31.8 g of p-dichlorobenzene (p-DCB) (0.217 mol), and 600 g of N-methyl-2-pyrrolidone (NMP) (6.05 mol) were fed to prepare a reaction mixture.

After the inside of the autoclave reactor was replaced with nitrogen gas, the reactor was sealed off, and the mixture heated with stirring at 400 rpm from room temperature to 200° C. over about 1 hour. Then, the temperature was raised from 200° C. to 250° C. over about 0.5 hours. At this stage, the pressure in the reactor was a gauge pressure of 1.0 MPa. Then, the reaction mixture was held at 250° C. for 2 hours to be heated and react.

An NMP solution of p-DCB (3.54 g of p-DCB in 10 g of NMP) was fed into a small reservoir having a 100 mL capacity installed above the autoclave reactor with a high pressure valve mediating therebetween. After the inside of the small reservoir was pressurized to about 1.5 MPa, the valve below the reservoir was opened, and the NMP solution of p-DCB was fed into the autoclave reactor. After the wall surface of the small reservoir was washed with 5 g of NMP, this NMP was also fed into the autoclave reactor. After this additional feed was completed, the heating was continued at 250° C. for another 1 hour, and the reaction allowed to progress. After the mixture was then cooled to 230° C. over about 15 minutes, the vapor mainly composed of NMP was discharged by gradually opening the high pressure valve installed above the autoclave reactor, and this vapor component was aggregated with a cooling pipe of a water cooling type to collect about 394 g of liquid component, whereafter the high pressure valve was closed to seal off the reactor. Then, the liquid component was rapidly cooled to about room temperature to collect the reaction product. A 200 g aliquot of the resulting reaction product was taken and fed into a flask having a 300 mL capacity. While the reaction product was being stirred with a magnetic stirrer, the reaction product slurry was sparged with nitrogen and heated to 100° C. in an oil bath. Solid-liquid separation of reaction product slurry A membrane filter made of polytetrafluoroethylene (PTFE) having a 90 mm diameter and a 10 µm average pore size was set in a filter holder with a universal reservoir, KST-90-UH, manufactured by Toyo Roshi Kaisha, Ltd., and the reservoir portion was adjusted to a temperature of 100° C. with a band heater. The reaction product heated to 100° C. was fed into the reservoir; the reservoir was sealed off; the inside of the reservoir was replaced with nitrogen and pressurized to 0.1 MPa; and solid-liquid separation was allowed to progress until the discharge of the filtrate was completed.

Collection of PPS Prepolymer

Into a 300 mL flask, 100 g of the filtrate component obtained by the solid-liquid separation was fed, and the inside of the flask was replaced with nitrogen. The filtrate component was then heated to 100° C. with stirring and cooled to 80° C. During this, some insoluble parts were present at normal temperature, but there were no soluble parts recognized at the stages where the temperature reached 100° C. and where the component was further cooled to 80° C. Then, 33 g of water was slowly added dropwise using a tube pump with stirring at a temperature of 80° C. in the system over about 15 minutes. The weight ratio of NMP to water in the filtrate mixture was 75:25 after the water dropping completed. When the water was added to the filtrate, the water dropping resulted in lowering the temperature of the mixture to about 75° C. and also in generating a solid in the mixture gradually, and the mixture became a slurry with the solid dispersed therein at the stage where the water dropping completed. This slurry was cooled to about 30° C. with stirring over about 1 hour, and kept stirring at 30° C. or less for about 30 minutes, whereafter the resulting slurry was suction-filtered with a glass filter having an opening size of 10 to 16 µm. The resulting solid was dispersed in about 30 g of water and stirred at 70° C. for 15 minutes, followed by repeating the operation of the suction-filtration with a glass filter in the same manner as aforementioned 4 times in total. The resulting solid was dried in a vacuum dryer at 70° C. for 3 hours to obtain a PPS prepolymer in the form of a dry solid. This PPS prepolymer is referred to as a first prepolymer.

The resulting PPS prepolymer was analyzed by high performance liquid chromatography, and as a result, found to contain 88% by weight of a cyclic PPS. In addition, the results of carrying out a GPC measurement showed a number average molecular weight of 800, a weight average molecular weight of 1,100, and a polydispersity index of 1.38.

Reference Example 2

Preparation of Second PPS Prepolymer

Into an autoclave reactor with an agitator, 28.1 g of a 48% by weight sodium hydrosulfide aqueous solution (0.241 mol of sodium hydrosulfide), 21.1 g of a 48% by weight sodium hydroxide aqueous solution (0.253 mol of sodium hydroxide), 35.4 g of p-DCB (0.241 mol), and 600 g of NMP (6.05 mol) were fed to prepare a reaction mixture. Per mol of a sulfur component in the reaction mixture (per mol of sulfur atoms contained in sodium hydrosulfide fed as a sulfidizing agent), the amount of an arylene unit (corresponding to p-DCB fed as a dihalogenated aromatic compound) was 1.00 mol. After the inside of the autoclave reactor was replaced with nitrogen gas, the reactor was sealed off, and the mixture was heated with stirring at 400 rpm from room temperature to 200° C. over about 1 hour. Then, the temperature was raised from 200° C. to 250° C. over about 0.5 hours. At this stage, the pressure in the reactor was a gauge pressure of 1.0 MPa. Then, the reaction mixture was held at 250° C. for 2 hours to be heated and react.

An NMP solution of p-DCB (8.84 g of p-DCB dissolved in 20 g of NMP) was fed into a small reservoir having a 100 mL capacity installed above the autoclave reactor with a high pressure valve mediating therebetween. After the inside of the small reservoir was pressurized to about 1.5 MPa, the valve below the reservoir was opened, and the NMP solution of p-DCB was fed into the autoclave reactor. After the wall surface of the small reservoir was washed with 5 g of NMP, this NMP was also fed into the autoclave reactor. After the mixture was then cooled to 230° C. over about 15 minutes, the vapor mainly composed of NMP was discharged by gradually opening the high pressure valve installed above the autoclave reactor, and this vapor component was aggregated with a cooling pipe of a water cooling type to collect about 394 g of liquid component, whereafter the high pressure valve was closed to seal off the reactor. Then, the liquid component was rapidly cooled to about room temperature to collect the reaction product. The resulting reaction product was filtered under pressure and thereby separated into solid and liquid in the same manner as in the solid-liquid separation of the reaction product slurry in Reference Example 1, and the resulting filtrate component was then treated in the same manner as in the collection of the cyclic polyarylene sulfide in Reference Example 1, to obtain a PPS prepolymer. This PPS prepolymer is referred to as a second PPS prepolymer.

The resulting PPS prepolymer was analyzed by high performance liquid chromatography, and as a result, found to contain 82% by weight of a cyclic PPS. In addition, the results of carrying out a GPC measurement showed a number average molecular weight of 800, a weight average molecular weight of 1,300, and a polydispersity index of 1.62.

Reference Example 3

Preparation of PPS Resin (a) Having a Weight Average Molecular Weight of 50,000 or More and Having a ΔWr of 0.18% or Less, by Heating First PPS Prepolymer The first PPS prepolymer obtained in Reference Example 1 was fed into a glass test tube with a distillation pipe and an agitating blade, and subsequently the vacuumization and nitrogen replacement in the test tube were repeated 3 times. The inside of the test tube was vacuumized, and the prepolymer was heated with the pressure kept at about 0.1 kPa and with the temperature controlled at 340° C. for 180 minutes, and then cooled down to room temperature, to obtain a PPS resin in lump form.

Figure 8:
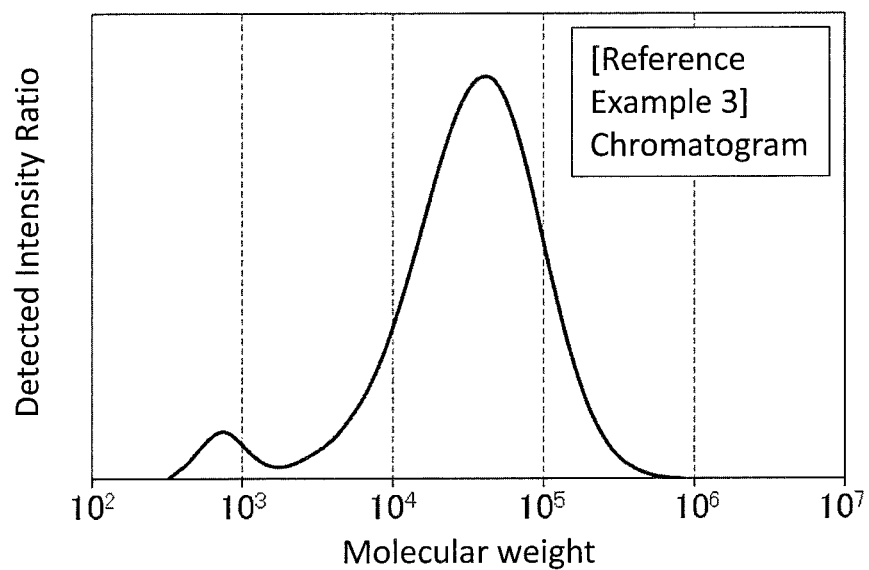
FIG. 8 is a GPC chart of the PPS resin (a) obtained in Reference Example 3.

The resulting PPS resin was completely dissolved in 1-chloronaphthalene at 210° C., and measured by GPC, with the result that a chart showing a bimodal molecular weight distribution was obtained as shown in FIG. 8. The main peak had a peak top molecular weight of 41,600, a number average molecular weight of 23,100, a weight average molecular weight of 54,200, and a polydispersity index of 2.35. The subpeak had a peak top molecular weight of 700, a number average molecular weight of 800, a weight average molecular weight of 900, a polydispersity index of 1.12, and the area fraction calculated from the area ratio on the chromatogram was 4.8%. Then, the weight reduction ratio of the resulting PPS resin that had been heated was measured, with the result that the ΔWr was 0.06%. In addition, the contents of alkali metal and alkaline earth metal in the resulting PPS resin were quantitated, with the results that 74 ppm by weight of sodium was detected and that no other alkali metal nor alkaline earth metal was detected. Further, the gas component generated by heating the resulting PPS resin was quantitated, with the result that γ-butyrolactone and 4-chloro-N-methylaniline were below detection limit. Further, the change rate of molecular weight of the resulting PPS resin with 2-(3,4-epoxycyclohexyl)ethyltrimethoxysilane added thereto was measured, with the result that the ΔMn was 0.0%. Lastly, the melt viscosities of the resulting PPS resin before and after heating treatment were measured, with the results that the $\eta_0$ and the $\eta_{300}$ were 99.1 Pa·s and 240 Pa·s respectively and that the $\Delta\eta_{300}$ was 2.42 times.

Reference Example 4

Preparation of PPS Resin Having a Weight Average Molecular Weight of Less than 50,000, by Heating Second PPS Prepolymer The second PPS prepolymer obtained in Reference Example 2 was fed into a glass test tube with a distillation pipe and an agitating blade and subsequently the vacuumization and nitrogen replacement in the test tube were repeated 3 times. The inside of the test tube was vacuumized, and the prepolymer was heated with the pressure kept at about 0.1 kPa and with the temperature controlled at 340° C. for 180 minutes, and then cooled down to room temperature, to obtain a PPS resin in lump form.

The resulting PPS resin was completely dissolved in 1-chloronaphthalene at 210° C., and measured by GPC, with the result that a chart showing a bimodal molecular weight distribution was obtained, which was similar to the chart of Reference Example 3. The main peak had a peak top molecular weight of 32,700, a number average molecular weight of 17,800, a weight average molecular weight of 42,800, and a polydispersity index of 2.40. The subpeak had a peak top molecular weight of 800, a number average molecular weight of 800, a weight average molecular weight of 900, a polydispersity index of 1.14, and the area fraction calculated from the area ratio on the chromatogram was 3.4%. Then, the weight reduction ratio of the resulting PPS resin that had been heated was measured, with the result that the ΔWr was 0.08%. In addition, the contents of alkali metal and alkaline earth metal in the resulting PPS resin were quantitated, with the results that 88 ppm by weight of sodium was detected and that no other alkali metal nor alkaline earth metal was detected. Further, the gas component generated by heating the resulting PPS resin was quantitated, with the result that γ-butyrolactone and 4-chloro-N-methylaniline were below detection limit. Further, the change rate of molecular weight of the resulting PPS resin with 2-(3,4-epoxycyclohexyl)ethyltrimethoxysilane added thereto was measured, with the result that the ΔMn was 0.4%. Lastly, the melt viscosities of the resulting PPS resin before and after heating treatment were measured, with the results that the $\eta_0$ and the $\eta_{300}$ were 36.3 Pa·s and 84.9 Pa·s respectively and that the $\Delta\eta_{300}$ was 2.34 times.

Reference Example 5

Preparation of PPS Resin (b) Having a Weight Average Molecular Weight of Less Than 50,000, an Alkaline Earth Metal Content of Less Than 200 ppm, and a ΔMn of 5.0% or Less A slurry was made by adding 200 g of ion exchanged water to the solid obtained in the solid-liquid separation of the reaction product slurry in Reference Example 1, and stirred at 80° C. for 30 minutes, followed by repeating, 3 times, the operation of filtering the slurry and collecting solid. The resulting solid was dried under vacuum at 130° C. for 8 hours to obtain a PPS resin in powder form.

Figure 9:
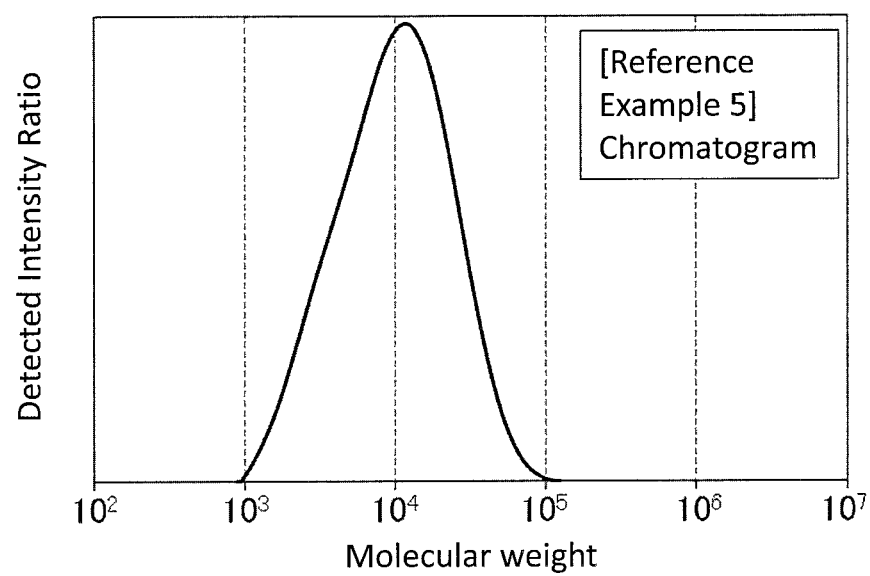
FIG. 9 is a GPC chart of the PPS resin (b) obtained in Reference Example 5.

The resulting PPS resin was completely dissolved in 1-chloronaphthalene at 210° C., and measured by GPC, with the result that a chart showing a unimodal molecular weight distribution was obtained as shown in FIG. 9. The peak top molecular weight was 11,600, the number average molecular weight was 5,700, the weight average molecular weight was 12,000, and the polydispersity index was 2.12. Then, the weight reduction ratio of the resulting PPS resin that had been heated was measured, with the result that the ΔWr was 0.20%. In addition, the contents of alkali metal and alkaline earth metal in the resulting PPS resin were quantitated, with the results that 278 ppm by weight of sodium was detected and that no other alkali metal nor alkaline earth metal was detected. Further, the gas component generated by heating the resulting PPS resin was quantitated, with the result that 286 ppm of γ-butyrolactone and 102 ppm of 4-chloro-N-methylaniline were detected. Further, the change rate of molecular weight of the resulting PPS resin with 2-(3,4-epoxycyclohexyl)ethyltrimethoxysilane added thereto was measured, with the result that the ΔMn was 1.2%. Lastly, the melt viscosities of the resulting PPS resin before and after heating treatment were measured, with the results that the $\eta_0$ and the $\eta_{300}$ were 0.81 Pa·s and 1.59 Pa·s respectively and that the $\Delta\eta_{300}$ was 1.96 times.

Reference Example 6

Preparation of PPS Resin Having a Large Content of Reactive Functional Groups, by Heating PPS Prepolymer in the Presence of Sulfide Compound Having Reactive Functional Groups The first PPS prepolymer obtained in Reference Example 1 and 1.0% by weight of bis(4-aminophenyl)sulfide relative to the weight of the PPS prepolymer were fed into a glass test tube with a distillation pipe and an agitating blade and subsequently the vacuumization and nitrogen replacement in the test tube were repeated 3 times. The inside of the test tube was allowed to remain a nitrogen atmosphere, the temperature was controlled at 340° C., the mixture was heated for 60 minutes, and subsequently the inside of the test tube was vacuumized, the mixture was heated at about 0.1 kPa for another 30 minutes and then cooled down to room temperature, to obtain a PPS resin in lump form.

The resulting PPS resin was completely dissolved in 1-chloronaphthalene at 210° C., and measured by GPC, with the result that a chart showing a bimodal molecular weight distribution was obtained, which was similar to those of Reference Examples 3 and 4. The main peak had a peak top molecular weight of 17,900, a number average molecular weight of 10,400, a weight average molecular weight of 21,000, and a polydispersity index of 2.01. The subpeak had a peak top molecular weight of 700, a number average molecular weight of 800, a weight average molecular weight of 900, a polydispersity index of 1.13, and the area fraction calculated from the area ratio on the chromatogram was 2.3%. Then, the weight reduction ratio of the resulting PPS resin that had been heated was measured, with the result that the ΔWr was 0.10%. In addition, the contents of alkali metal and alkaline earth metal in the resulting PPS resin were quantitated, with the results that 71 ppm by weight of sodium was detected and that no other alkali metal nor alkaline earth metal was detected. Further, the gas component generated by heating the resulting PPS resin was quantitated, with the result that γ-butyrolactone and 4-chloro-N-methylaniline were below detection limit. Further, the change rate of molecular weight of the resulting PPS resin with 2-(3,4-epoxycyclohexyl)ethyltrimethoxysilane added thereto was measured, with the result that the ΔMn was 7.5%. Lastly, the melt viscosities of the resulting PPS resin before and after heating treatment were measured, with the results that the $\eta_0$ and the $\eta_{300}$ were 1.72 Pa·s and 5.50 Pa·s respectively and that the $\Delta\eta_{300}$ was 3.20 times.

Reference Example 7

Solution Polymerization of PPS

Into an autoclave reactor with an agitator and a bottom stop valve, 8.17 kg of a 48% by weight sodium hydrosulfide aqueous solution (sodium hydrosulfide: 3.92 kg (70.0 mol)), 2.94 kg of a 96% by weight sodium hydroxide (sodium hydroxide: 2.82 kg (70.6 mol)), 11.45 kg of NMP (115.5 mol), 1.89 kg of sodium acetate (23.1 mol), and 5.50 kg of ion exchanged water were fed.

While being purged with nitrogen at normal pressure, the reactor vessel was heated from room temperature to 245° C. over 360 minutes to distill 10.1 kg of the solvent. After the reactor vessel was cooled down to 200° C., 10.42 kg (70.9 mol) of p-DCB and 9.37 kg (94.5 mol) of NMP were added, and the reactor vessel was sealed off with nitrogen gas inside and heated from 200° C. to 270° C. with stirring at 240 rpm over 120 minutes, allowing the reaction at 270° C. for 140 minutes. Subsequently, the reaction vessel was cooled from 270° C. to 250° C. over 15 minutes while 2.40 kg of ion exchanged water was forced into the reaction vessel. Then, the reaction vessel was cooled from 250° C. to 220° C. over 75 minutes and rapidly cooled down to about room temperature to collect the content.

The content was diluted with 35 liters of NMP, stirred as a slurry at 85° C. for 30 minutes, and subsequently separated into solid and liquid by filtration using a mesh having an opening size of 175 μm. The resulting solid was washed with 35 liters of NMP and filtered in the same manner as aforementioned. The resulting solid was added to 70 liters of ion exchanged water, and the resulting mixture was stirred at 70° C. for 30 minutes, followed by repeating, 3 times in total, the operation of filtering the mixture and collecting solid, to obtain a wet PPS resin.

Reference Example 8

Preparation of PPS Resin (c) Having an Alkaline Earth Metal Content of 200 ppm to 800 ppm and Having a ΔWr of More Than 0.18%, by Alkaline Earth Metal Treatment of Solution-Polymerized PPS Resin To 20 liters of ion exchanged water, 2.0 kg of the wet PPS resin obtained in Reference Example 7 and 11 g of calcium acetate monohydrate were added, and the resulting mixture was stirred at 70° C. for 30 minutes and subsequently separated into solid and liquid by filtration using a mesh having an opening size of 175 µm. To the resulting solid, 20 liters of ion exchanged water was added, and the resulting mixture was stirred at 70° C. for 30 minutes and then filtered to collect a solid. The solid thus obtained was dried under a nitrogen stream at 120° C. to obtain a PPS resin in granule form.

Figure 10:
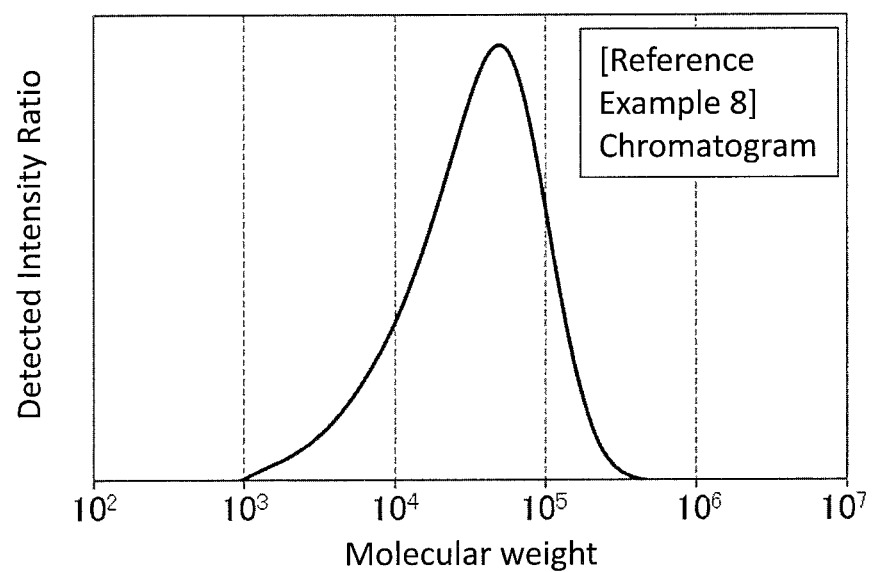
FIG. 10 is a GPC chart of the PPS resin (c) obtained in Reference Example 8.

The resulting PPS resin was completely dissolved in 1-chloronaphthalene at 210° C., and measured by GPC, with the result showing that the resin had a unimodal molecular weight distribution as shown in FIG. 10. The peak top molecular weight was 48,400, the number average molecular weight was 18,800, the weight average molecular weight was 50,000, and the polydispersity index was 2.66. Then, the weight reduction ratio of the resulting PPS resin that had been heated was measured, with the result that the $\Delta Wr$ was 0.25%. In addition, the contents of alkali metal and alkaline earth metal in the resulting PPS resin were quantitated, with the results that 261 ppm by weight of sodium and 440 ppm by weight of calcium were detected and that no other alkali metal nor alkaline earth metal was detected. Further, the gas component generated by heating the resulting PPS resin was quantitated, with the result that 958 ppm of γ-butyrolactone and 384 ppm of 4-chloro-N-methylaniline were detected relative to the weight of the PPS resin prior to heating. Further, the change rate of molecular weight of the resulting PPS resin with 2-(3,4-epoxycyclohexyl)ethyltrimethoxysilane added thereto was measured, with the result that the $\Delta Mn$ was 7.4%. Lastly, the melt viscosities of the resulting PPS resin before and after heating treatment were measured, with the results that the $\eta_0$ and the $\eta_{300}$ were 206 Pa·s and 124 Pa·s respectively and that the $\Delta \eta_{300}$ was 0.60 times.

Reference Example 9

Preparation of PPS Resin Having a Large Content of Sodium

Under a nitrogen stream, 2.0 kg of the wet PPS resin obtained in Reference Example 7 was dried at 120° C. to obtain a PPS resin in granule form. The resulting PPS resin was completely dissolved in 1-chloronaphthalene at 210° C., and the resulting PPS resin was measured by GPC, with the result showing that the resin had a unimodal molecular weight distribution in the same manner as in Reference Example 8. The peak top molecular weight was 48,400, the number average molecular weight was 18,700, the weight average molecular weight was 50,100, and the polydispersity index was 2.68. Then, the weight reduction ratio of the resulting PPS resin that had been heated was measured, with the result that the $\Delta Wr$ was 0.25%. In addition, the contents of alkali metal and alkaline earth metal in the resulting PPS resin were quantitated, with the results that 912 ppm by weight of sodium was detected and that no other alkali metal nor alkaline earth metal was detected. Further, the gas component generated by heating the resulting PPS resin was quantitated, with the result that 978 ppm of γ-butyrolactone and 402 ppm of 4-chloro-N-methylaniline were detected relative to the weight of the PPS resin prior to heating. Further, the change rate of molecular weight of the resulting PPS resin with 2-(3,4-epoxycyclohexyl)ethyltrimethoxysilane added thereto was measured, with the result that the $\Delta Mn$ was 8.0%. Lastly, the melt viscosities of the resulting PPS resin before and after heating treatment were measured, with the results that the $\eta_0$ and the $\eta_{300}$ were 126 Pa·s and 102 Pa·s respectively and that the $\Delta \eta_{300}$ was 0.81 times.

Reference Example 10

Preparation of PPS Resin Having a Reduced Content of Sodium, by Neutralization Treatment of Solution-Polymerized PPS Resin To 20 liters of ion exchanged water, 2.0 kg of the wet PPS resin obtained in Reference Example 7 was added, acetic acid was added such that the resulting mixture had a pH of 7, and the mixture was stirred at 70° C. for 30 minutes and subsequently separated into solid and liquid by filtration using a mesh having an opening size of 175 µm. To the resulting solid, 20 liters of ion exchanged water was added, and the resulting mixture was stirred at 70° C. for 30 minutes and then filtered to collect a solid. The solid thus obtained was dried under a nitrogen stream at 120° C. to obtain a PPS resin in granule form.

The resulting PPS resin was completely dissolved in 1-chloronaphthalene at 210° C., and measured by GPC, with the result showing that the resin had a unimodal molecular weight distribution in the same manner as in Reference Examples 8 and 9. The peak top molecular weight was 48,200, the number average molecular weight was 18,800, the weight average molecular weight was 49,900, and the polydispersity index was 2.65. Then, the weight reduction ratio of the resulting PPS resin that had been heated was measured, with the result that the $\Delta Wr$ was 0.26%. In addition, the contents of alkali metal and alkaline earth metal in the resulting PPS resin were quantitated, with the results that 512 ppm by weight of sodium was detected and that no other metal was detected. Further, the gas component generated by heating the resulting PPS resin was quantitated, with the result that 952 ppm of γ-butyrolactone and 376 ppm of 4-chloro-N-methylaniline were detected relative to the weight of the PPS resin prior to heating. Further, the change rate of molecular weight of the resulting PPS resin with 2-(3,4-epoxycyclohexyl)ethyltrimethoxysilane added thereto was measured, with the result that the $\Delta Mn$ was 8.2%. Lastly, the melt viscosities of the resulting dry PPS before and after heating treatment were measured, with the results that the $\eta_0$ and the $\eta_{300}$ were 104 Pa·s and 138 Pa·s respectively and that the $\Delta \eta_{300}$ was 1.33 times.

Reference Example 11

Preparation of PPS Resin Having a Low Content of Sodium, by Acid Treatment of Solution-Polymerized PPS Resin To 20 liters of ion exchanged water, 2.0 kg of the wet PPS resin obtained in Reference Example 7 and 10 g of acetic acid were added. At this time, the solution had a pH of 4. The solution was stirred at 70° C. for 30 minutes, and subsequently separated into solid and liquid by filtration using a mesh having an opening size of 175 µm. To the resulting solid, 20 liters of ion exchanged water was added, and the resulting mixture was stirred at 70° C. for 30 minutes and then filtered to collect a solid. The solid thus obtained was dried under a nitrogen stream at 120° C. to obtain a PPS resin in granule form.

The resulting PPS resin was completely dissolved in 1-chloronaphthalene at 210° C., and measured by GPC, with the result showing that the resin had a unimodal molecular weight distribution in the same manner as in Reference Examples 8 and 10. The peak top molecular weight was 48,300, the number average molecular weight was 18,800, the weight average molecular weight was 50,300, and the polydispersity index was 2.68. Then, the weight reduction ratio of the resulting PPS resin that had been heated was measured, with the result that the ΔWr was 0.27%. In addition, the contents of alkali metal and alkaline earth metal in the resulting PPS resin were quantitated, with the results that 84 ppm by weight of sodium was detected and that no other metal was detected. Further, the gas component generated by heating the resulting PPS resin was quantitated, with the result that 964 ppm of γ-butyrolactone and 370 ppm of 4-chloro-N-methylaniline were detected relative to the weight of the PPS resin prior to heating. Further, the change rate of molecular weight of the resulting PPS resin with 2-(3,4-epoxycyclohexyl)ethyltrimethoxysilane added thereto was measured, with the result that the ΔMn was 9.1%. Lastly, the melt viscosities of the resulting PPS resin before and after heating treatment were measured, with the results that the $\eta_0$ and the $\eta_{300}$ were 87.8 Pa·s and 187 Pa·s respectively and that the $\Delta\eta_{300}$ was 2.13 times.

Reference Example 12

Preparation of PPS Resin Containing Calcium, by Adding Calcium Acetate During the Heating of PPS Prepolymer The first PPS prepolymer obtained in Reference Example 1 and 0.044% by weight of calcium acetate monohydrate relative to the weight of the PPS prepolymer were fed into a glass test tube with a distillation pipe and an agitating blade and subsequently the vacuumization and nitrogen replacement in the test tube were repeated 3 times. The inside of the test tube was vacuumized, and the prepolymer was heated with the pressure kept at about 0.1 kPa and with the temperature controlled at 340° C. for 180 minutes, and then cooled down to room temperature, to obtain a PPS resin in lump form.

The resulting PPS resin was completely dissolved in 1-chloronaphthalene at 210° C., and measured by GPC, with the result that a chart showing a bimodal molecular weight distribution was obtained, which was similar to those of Reference Examples 3, 4, and 6. The main peak had a peak top molecular weight of 41,300, a number average molecular weight of 22,100, a weight average molecular weight of 53,800, and a polydispersity index of 2.43. The subpeak had a peak top molecular weight of 700, a number average molecular weight of 800, a weight average molecular weight of 900, a polydispersity index of 1.11, and the area fraction calculated from the area ratio on the chromatogram was 5.2%. Then, the weight reduction ratio of the resulting PPS resin that had been heated was measured, with the result that the ΔWr was 0.08%. In addition, the contents of alkali metal and alkaline earth metal in the resulting PPS resin were quantitated, with the results that 72 ppm by weight of sodium and 101 ppm by weight of calcium were detected and that no other alkali metal nor alkaline earth metal was detected. Further, the gas component generated by heating the resulting PPS resin was quantitated, with the result that γ-butyrolactone and 4-chloro-N-methylaniline were below detection limit. Further, the change rate of molecular weight of the resulting PPS resin with 2-(3,4-epoxycyclohexyl) ethyltrimethoxysilane added thereto was measured, with the result that the ΔMn was 0.1%. Lastly, the melt viscosities of the resulting PPS resin before and after heating treatment were measured, with the results that them and the $\eta_{300}$ were 98.2 Pa·s and 234 Pa·s respectively and that the $\Delta\eta_{300}$ was 2.38 times. These results have revealed that no improvement was found in residence stability on the PPS resin obtained by incorporating an alkaline earth metal thereinto using a method different from our method (the blending of the PPS resin (c)).

Reference Example 13

Blending of Two Kinds of PPS Resins Whose Molecular Weights are Different

Figure 11:
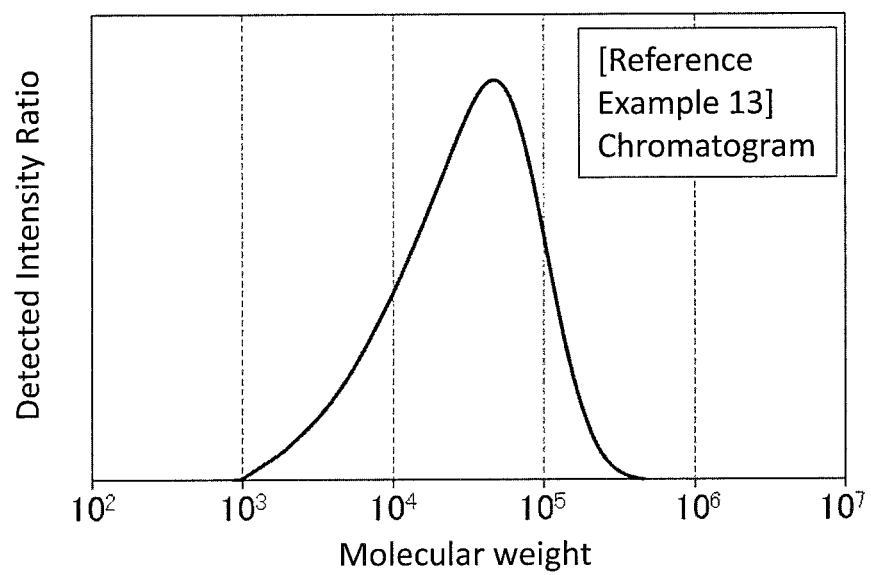
FIG. 11 is a GPC chart of the PPS resin composition obtained in Reference Example 13.

Ninety percent by weight of the PPS resin having a weight average molecular weight of 50,300 obtained in Reference Example 11 and 10% by weight of the PPS resin having a weight average molecular weight of 12,000 obtained in Reference Example 5 were dry-blended, melt-kneaded using a twin screw extruder TEX 30α with a vacuum vent manufactured by the Japan Steel Works, Ltd. (screw diameter: 30 mm, L/D=45, five kneading sections, fully intermeshing-type screws rotating in the same direction), and pelletized with a strand cutter. The conditions of melt kneading were the screw rotation speed of 300 rpm, the discharge rate of 20 kg/hr, and the cylinder temperature set to control the resin temperature in the die discharge outlet to 300° C. The pellets dried at 130° C. overnight were measured by GPC, with the result showing that the resin had a unimodal molecular weight distribution as shown in FIG. 11.

Examples 1 to 7 and Comparative Examples 1 and 7

The respective components were dry-blended at the blending ratios shown in Tables 1 to 3, melt-kneaded under the conditions described in Reference Example 13, and pelletized. The pellets were dried at 130° C. overnight and analyzed, with the results shown in Tables 1 to 3. The GPC charts from Examples 1 to 7 are shown in FIGS. 1 to 7. In addition, the analysis results of the PPS resins obtained by solution polymerization (Reference Examples 8 to 11) are shown in Table 4 for comparison with the Examples. The resulting PPS resin obtained in Example 1 was completely dissolved in 1-chloronaphthalene at 210° C., and measured by GPC, with the result that a chart showing a bimodal molecular weight distribution was obtained as shown in FIG. 1. The main peak had a peak top molecular weight of 38,200, a number average molecular weight of 17,600, a weight average molecular weight of 49,700, and a polydispersity index of 2.82; and the subpeak had a peak top molecular weight of 700, a number average molecular weight of 800, a weight average molecular weight of 900, and a polydispersity index of 1.10.

TABLE 1

| | | Example 1 | Example 2 | Example 3 | Comparative Example 1 | Comparative Example 2 | Comparative Example 3 | Reference Example 3 |
|---|---|---|---|---|---|---|---|---|
| Compounded amount | PPS resin (a) obtained by Reference Example 3 | 90 | 70 | 50 | 30 | — | 90 | 100 |

TABLE 1-continued

|  |  | Example 1 | Example 2 | Example 3 | Comparative Example 1 | Comparative Example 2 | Comparative Example 3 | Reference Example 3 |
|---|---|---|---|---|---|---|---|---|
| (wt %) | PPS resin obtained by Reference Example 4 | — | — | — | — | 90 | — | — |
|  | PPS resin (b) obtained by Reference Example 5 | 10 | 30 | 50 | 70 | 10 | — | — |
|  | PPS resin obtained by Reference Example 6 | — | — | — | — | — | 10 | — |
| Peak top molecular weight of the main peak ($\times 10^4$) | | 3.82 | 2.64 | 1.71 | 1.35 | 2.88 | 3.66 | 4.16 |
| Peak top molecular weight of the subpeak | | 700 | 700 | 700 | 700 | 800 | 700 | 700 |
| Area fraction of the subpeak (%) | | 4.6 | 3.4 | 2.6 | 1.9 | 3.2 | 4.4 | 4.8 |
| $\eta_0$ (Pa·s) | | 60.2 | 39.2 | 21.4 | 11.2 | 16.8 | 70.8 | 99.1 |
| $\eta_{300}$ (Pa·s) | | 83.1 | 40 | 20.1 | 11 | 28.2 | 169 | 240 |
| $\Delta\eta_{300}$ (times) | | 1.38 | 1.02 | 0.94 | 0.98 | 1.68 | 2.38 | 2.42 |
| Alkali metal content (ppm) | | 94 | 134 | 176 | 218 | 107 | 138 | 74 |
| Alkali earth metal content (ppm) | | n.d.[1] | n.d.[1] | n.d.[1] | n.d.[1] | n.d.[1] | n.d.[1] | n.d.[1] |
| $\Delta Wr$ (%) | | 0.08 | 0.12 | 0.15 | 0.18 | 0.08 | 0.08 | 0.06 |
| Lactone-type compound (ppm) | | 30 | 85 | 148 | 205 | 31 | n.d.[1] | n.d.[1] |
| Aniline-type compound (ppm) | | 12 | 34 | 49 | 62 | 11 | n.d.[1] | n.d.[1] |
| $\Delta Mn$ (%) | | 0.1 | 0.3 | 0.7 | 0.8 | 0.5 | 1.4 | 0 |

[1] below measurable limits

Examples 1 to 3 have revealed that blending the PPS resin (b) with the PPS resin (a) can afford a PPS resin composition having a change rate of viscosity of 1.50 times or less, which is small. In addition, the comparison between Examples 1 to 3 and Comparative Example 1 has revealed that the PPS resin composition obtained by blending 50% by weight or more of the PPS resin (a) generates a smaller amount of lactone-type compound and aniline-type compound when heated, or that the PPS resin composition generates a reduced amount of gas. Further, from the comparison between Example 1 and Comparative Example 2, it is apparent that a PPS resin composition having a change rate of viscosity of 1.50 times or less, which is small, can be obtained only by blending the PPS resin (b) with the PPS resin (a) having a weight average molecular weight of 50,000 or more. In addition, from the comparison between Example 1 and Comparative Example 3, it is apparent that a PPS resin composition having a change rate of viscosity of 1.50 times or less, which is small, can be obtained only by blending the PPS resin (b) having a $\Delta Mn$ of 5% or less with the PPS resin (a).

TABLE 2

|  |  | Example 4 | Example 5 | Example 6 | Comparative Example 4 | Comparative Example 5 | Comparative Example 6 | Comparative Example 7 | Reference Example 3 |
|---|---|---|---|---|---|---|---|---|---|
| Compounded amount (wt %) | PPS resin (a) obtained by Reference Example 3 | 90 | 70 | 50 | 30 | 90 | 90 | 90 | 100 |
|  | PPS resin (c) obtained by Reference Example 8 | 10 | 30 | 50 | 70 | — | — | — | — |
|  | PPS resin obtained by Reference Example 9 | — | — | — | — | 10 | — | — | — |
|  | PPS resin obtained by Reference Example 10 | — | — | — | — | — | 10 | — | — |
|  | PPS resin obtained by Reference Example 11 | — | — | — | — | — | — | 10 | — |
| Peak top molecular weight of the main peak ($\times 10^4$) | | 4.2 | 4.39 | 4.53 | 46.8 | 4.2 | 4.18 | 4.19 | 4.16 |
| Peak top molecular weight of the subpeak | | 700 | 700 | 700 | 700 | 700 | 700 | 700 | 700 |
| Area fraction of the subpeak (%) | | 4.5 | 3.4 | 2.5 | 1.4 | 4.6 | 4.6 | 4.4 | 4.8 |
| $\eta_0$ (Pa·s) | | 108 | 120 | 138 | 160 | 104 | 101 | 97.2 | 99.1 |
| $\eta_{300}$ (Pa·s) | | 156 | 136 | 126 | 133 | 186 | 200 | 202 | 240 |
| $\Delta\eta_{300}$ (times) | | 1.44 | 1.13 | 0.91 | 0.83 | 1.79 | 1.98 | 2.08 | 2.42 |
| Alkali metal content (ppm) | | 93 | 145 | 197 | 250 | 158 | 118 | 75 | 74 |
| Alkali earth metal content (ppm) | | 44 | 132 | 220 | 308 | n.d.[1] | n.d.[1] | n.d.[1] | n.d.[1] |
| $\Delta Wr$ (%) | | 0.1 | 0.15 | 0.19 | 0.23 | 0.09 | 0.11 | 0.11 | 0.06 |
| Lactone-type compound (ppm) | | 90 | 293 | 489 | 690 | 88 | 93 | 95 | n.d.[1] |
| Aniline-type compound (ppm) | | 41 | 115 | 190 | 262 | 43 | 38 | 36 | n.d.[1] |
| $\Delta Mn$ (%) | | 0.8 | 1.9 | 3.2 | 4.8 | 1.1 | 1 | 1.1 | 0 |

[1] below measurable limits

Examples 4 to 6 have revealed that blending the PPS resin (c) with the PPS resin (a) can afford a PPS resin composition having a change rate of viscosity of 1.50 times or less, which is small. In addition, the comparison between Examples 4 to 6 and Comparative Example 4 has revealed that the PPS resin composition obtained by blending 50% by weight or more of the PPS resin (a) generates a smaller amount of lactone-type compound and aniline-type compound when heated, or that the PPS resin composition generates a reduced amount of gas. Further, from the comparison between Example 4 and Comparative Examples 5 to 7, it is apparent that a PPS resin composition having a change rate of viscosity of 1.50 times or less, which is small, can be obtained only by blending the Ca-treated PPS resin (c) with the PPS resin (a).

TABLE 3

|  |  | Example 2 | Example 5 | Example 7 | Reference Example 3 |
|---|---|---|---|---|---|
| Compounded amount (wt %) | PPS resin (a) obtained by Reference Example 3 | 70 | 70 | 70 | 100 |
|  | PPS resin (b) obtained by Reference Example 5 | 30 | — | 15 | — |
|  | PPS resin (c) obtained by Reference Example 8 | — | 30 | 15 | — |
| Peak top molecular weight of the main peak ($\times 10^4$) |  | 2.64 | 4.39 | 3.82 | 4.16 |
| Peak top molecular weight of the subpeak |  | 700 | 700 | 700 | 700 |
| Area fraction of the subpeak (%) |  | 3.4 | 3.4 | 3.5 | 4.8 |
| $\eta_0$ (Pa·s) |  | 39.2 | 120 | 64.2 | 99.1 |
| $\eta_{300}$ (Pa·s) |  | 40 | 136 | 57.1 | 240 |
| $\Delta\eta_{300}$ (times) |  | 1.02 | 1.13 | 0.89 | 2.42 |
| Alkali metal content (ppm) |  | 134 | 145 | 138 | 74 |
| Alkali earth metal content (ppm) |  | n.d.[1] | 132 | 67 | n.d.[1] |
| $\Delta$Wr (%) |  | 0.12 | 0.15 | 0.14 | 0.06 |
| Lactone-type compound (ppm) |  | 85 | 293 | 185 | n.d.[1] |
| Aniline-type compound (ppm) |  | 34 | 115 | 78 | n.d.[1] |
| $\Delta$Mn (%) |  | 0.3 | 1.9 | 1.2 | 0 |

[1] below measurable limits

The comparison between Examples 2 and 5 and Example 7 has revealed that a PPS resin composition having a smaller change rate of viscosity can be more easily obtained by using both the PPS resin (b) and the PPS resin (c) with the PPS resin (a) than by blending either the PPS resin (b) or the PPS resin (c) with the PPS resin (a).

TABLE 4

|  | Reference Example 8 | Reference Example 9 | Reference Example 10 | Reference Example 11 |
|---|---|---|---|---|
| Peak top molecular weight of the main peak | 4.84 | 4.84 | 4.82 | 4.83 |
| Peak top molecular weight of the subpeak | —[1] | —[1] | —[1] | —[1] |
| Area fraction of the subpeak (%) | —[1] | —[1] | —[1] | —[1] |
| $\eta_0$ (Pa·s) | 206 | 126 | 104 | 88 |
| $\eta_{300}$ (Pa·s) | 124 | 102 | 138 | 187 |
| $\Delta\eta_{300}$ (times) | 0.6 | 0.81 | 1.33 | 2.13 |
| Alkali metal content (ppm) | 261 | 912 | 512 | 84 |
| Alkali earth metal content (ppm) | 440 | n.d.[2] | n.d.[2] | n.d.[2] |
| $\Delta$Wr (%) | 0.25 | 0.25 | 0.26 | 0.27 |
| Lactone-type compound (ppm) | 958 | 978 | 952 | 964 |
| Aniline-type compound (ppm) | 384 | 402 | 376 | 370 |
| $\Delta$Mn (%) | 7.4 | 8 | 8.2 | 9.1 |

[1] Only one peak in GPC chart
[2] below measurable limits

The comparison between Examples 1 to 7 and the solution-polymerized PPS resins obtained in Reference Examples 8 to 11 revealed that the PPS resin composition obtained by blending 50% by weight or more of the PPS resin (a) generates a smaller amount of lactone-type compound and aniline-type compound when heated, or that the PPS resin composition generates a reduced amount of gas.

INDUSTRIAL APPLICABILITY

The PPS resin composition has excellent heat resistance, chemical resistance, electric property, and mechanical properties as well as excellent melt stability and low gas generation, and is used to produce various molded products by known molding methods such as injection molding, injection compression molding, blow molding and extrusion molding. The PPS resin is preferred for application in fibers and films for which high melt stability is demanded, among others, and fibers and films obtained by molding the PPS resin can be favorably used for various applications such as dryer canvas of paper machines, net conveyors, bag filters, insulation paper film condensers, motor insulation films, transformer insulation films, and pressure sensitive films for separating. In this regard, it is possible to confirm that moldings obtained by molding the PPS resin have the characteristics of low change rate of viscosity and bimodal molecular weight distribution that the PPS resin composition has.

The invention claimed is:

1. A polyphenylene sulfide resin composition that, in a molecular weight distribution measured in size exclusion chromatography,
    (i) has a peak top of a main peak in a molecular weight region of 10,000 to 1,000,000, and
    (ii) has a peak top of a subpeak in a molecular weight region of 100 to less than 10,000,
    (iii) wherein the area fraction of the subpeak is 1.0 to 20%;
    and that has a change rate of viscosity of 1.5 times or less when the composition is heated at 320° C. for 5 hours.

2. A polyphenylene sulfide resin composition of claim 1 comprising
    90 to 50% by weight of a polyphenylene sulfide resin (a) and total of 10 to 50% by weight of a polyphenylene sulfide resin (b) and/or a polyphenylene sulfide resin (c) blended with the polyphenylene sulfide resin (a), relative to the total of the polyphenylene sulfide resins (a) to (c) as 100% by weight, wherein the polyphenylene sulfide resin composition has a change rate of viscosity of 1.5 times or less when the composition is heated at 320° C. for 5 hours;

the polyphenylene sulfide resin (a) is a polyphenylene sulfide resin having a weight average molecular weight of 50,000 or more and having a weight reduction ratio ΔWr of 0.18% or less when the resin is heated, wherein the ratio is represented by Equation (1);

the polyphenylene sulfide resin (b) is a polyphenylene sulfide resin having a weight average molecular weight of less than 50,000 and an alkaline earth metal content of less than 200 ppm, and having an increase rate of molecular weight of 5.0% or less when the resin is heated at 320° C. for 10 minutes together with 0.5% by weight of 2-(3,4-epoxycyclohexyl)ethyltrimethoxysilane added thereto; and the polyphenylene sulfide resin (c) is a polyphenylene sulfide resin containing 200 to 800 ppm of an alkaline earth metal (d), and has a weight reduction ratio ΔWr of more than 0.18% when the resin is heated, wherein the ratio is represented by Equation (1):

$$\Delta Wr = (W1-W2)/W1 \times 100 (\%) \quad (1)$$

(wherein ΔWr is a weight reduction ratio (%), which is a value determined from a sample weight (W1) at 100° C. reached and a sample weight (W2) at 330° C. reached in thermogravimetric analysis carried out under a non-oxidizing atmosphere at normal pressure at a temperature raising rate of 20° C./minute).

3. The polyphenylene sulfide resin composition according to claim 2, wherein a polydispersity index obtained by dividing a weight average molecular weight of the polyphenylene sulfide resin (a) by a number average molecular weight thereof is 2.5 or less.

4. The polyphenylene sulfide resin composition according to claim 2, wherein the polyphenylene sulfide resin (a) has an alkali metal content of 700 ppm by weight or less.

5. The polyphenylene sulfide resin composition according to claim 2, wherein a lactone-type compound content in a gas component generated by heating the polyphenylene sulfide resin (a) is 500 ppm by weight or less relative to the weight of the polyphenylene sulfide resin.

6. The polyphenylene sulfide resin composition according to claim 2, wherein an aniline-type compound content in a gas component generated by heating the polyphenylene sulfide resin (a) is 300 ppm by weight or less relative to the weight of the polyphenylene sulfide resin.

7. The polyphenylene sulfide resin composition according to claim 2, wherein the polyphenylene sulfide resin (a) is a polyphenylene sulfide resin obtained by heating a polyphenylene sulfide prepolymer that contains a 85% by weight or more of a cyclic polyphenylene sulfide represented by General Formula (A):

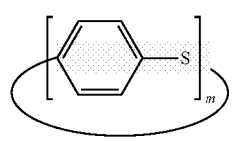

(A)

(wherein m is an integer of 4 to 20, and the cyclic polyphenylene sulfide may be a mixture of compounds represented by General Formula (A) which have different m values from 4 to 20)

and that has a weight average molecular weight of less than 10,000, and by converting the prepolymer to a high polymerization degree product having a weight average molecular weight of 50,000 or more.

8. The polyphenylene sulfide resin composition according to claim 2, wherein the lactone-type compound content in a gas component generated by heating the polyphenylene sulfide resin (b) is 500 ppm by weight or less relative to the weight of the polyphenylene sulfide resin.

9. The polyphenylene sulfide resin composition according to claim 2, wherein the alkaline earth metal (d) is calcium.

10. The polyphenylene sulfide resin composition according to claim 1, having an alkaline earth metal content of 20 to 1,000 ppm by weight.

11. The polyphenylene sulfide resin composition according to claim 1, wherein a weight reduction ratio ΔWr represented by Equation (1) is 0.30% or less when the composition is heated, and Equation (1) is represented by:

$$\Delta Wr = (W1-W2)/W1 \times 100 (\%) \quad (1)$$

(wherein ΔWr is a weight reduction ratio (%), which is a value determined from a sample weight (W1) at 100° C. reached and a sample weight (W2) at 330° C. reached in thermogravimetric analysis carried out under a non-oxidizing atmosphere at normal pressure at a temperature raising rate of 20° C./minute).

12. A process of producing a polyphenylene sulfide resin composition of claim 1, the process comprising blending a polyphenylene sulfide resin (a) in an amount of 90 to 50% by weight with a polyphenylene sulfide resin (b) and/or a polyphenylene sulfide resin (c) in a total amount of 10 to 50% by weight, relative to the total of the polyphenylene sulfide resins (a) to (c) as 100% by weight, wherein the resulting polyphenylene sulfide resin composition has a change rate of viscosity of 1.5 times or less when the composition is heated at 320° C. for 5 hours;

the polyphenylene sulfide resin (a) is a polyphenylene sulfide resin having a weight average molecular weight of 50,000 or more and having a weight reduction ratio ΔWr of 0.18% or less when the resin is heated, wherein the ratio is represented by Equation (1);

the polyphenylene sulfide resin (b) is a polyphenylene sulfide resin having a weight average molecular weight of less than 50,000 and an alkaline earth metal content of less than 200 ppm, and having an increase rate of molecular weight of 5.0% or less when the resin is heated at 320° C. for 10 minutes together with 0.5% by weight of 2-(3,4-epoxycyclohexyl)ethyltrimethoxysilane added thereto; and the polyphenylene sulfide resin (c) is a polyphenylene sulfide resin containing 200 to 800 ppm of an alkaline earth metal (d) and has a weight reduction ratio ΔWr of more than 0.18% when the resin is heated, wherein the ratio is represented by Equation (1):

$$\Delta Wr = (W1-W2)/W1 \times 100 (\%) \quad (1)$$

(wherein ΔWr is a weight reduction ratio (%), which is a value determined from a sample weight (W1) at 100° C. reached and a sample weight (W2) at 330° C. reached in thermogravimetric analysis carried out under a non-oxidizing atmosphere at normal pressure at a temperature raising rate of 20° C./minute).

\* \* \* \* \*